(12) United States Patent
Igarashi et al.

(10) Patent No.: US 10,225,506 B2
(45) Date of Patent: Mar. 5, 2019

(54) INFORMATION PROCESSING APPARATUS AND INFORMATION PROCESSING METHOD

(71) Applicant: SONY CORPORATION, Tokyo (JP)

(72) Inventors: Tatsuya Igarashi, Tokyo (JP); Norifumi Kikkawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/326,550

(22) PCT Filed: May 25, 2015

(86) PCT No.: PCT/JP2015/064895
§ 371 (c)(1),
(2) Date: Jan. 16, 2017

(87) PCT Pub. No.: WO2016/017254
PCT Pub. Date: Feb. 4, 2016

(65) Prior Publication Data
US 2017/0201709 A1    Jul. 13, 2017

(30) Foreign Application Priority Data

Aug. 1, 2014    (JP) ................................. 2014-158133

(51) Int. Cl.
*H04N 5/445*    (2011.01)
*G06F 3/048*    (2013.01)
(Continued)

(52) U.S. Cl.
CPC ......... *H04N 5/44504* (2013.01); *G06F 3/013* (2013.01); *G06F 3/048* (2013.01);
(Continued)

(58) Field of Classification Search
None
See application file for complete search history.

(56) References Cited

U.S. PATENT DOCUMENTS 6,037,936 A  *  3/2000  Ellenby .................. G01C 17/34
                                           348/211.8
8,400,548 B2 *  3/2013  Bilbrey ................. G06F 1/1694
                                           348/333.01
(Continued)

FOREIGN PATENT DOCUMENTS

JP    2006-091390 A    4/2006
JP    2010-238096 A    10/2010
(Continued)

*Primary Examiner* — James M Hannett
(74) *Attorney, Agent, or Firm* — Chip Law Group

(57) ABSTRACT

The present disclosure is intended to display registration information on a real-world registration information setting point and update the display with detection of an event in accordance with a change in the context as a trigger. A control for displaying a virtual object including registration information on a real-world registration information setting point is performed. The data processing unit performs a process for displaying registration information described in control data and a process for updating the display in accordance with a change in predefined context. Further, the data processing unit displays the virtual object indicative of the registration information setting point in conjunction with the display of the registration information. The data processing unit calculates the positional relationship between an information processing apparatus and the registration information setting point on the basis of the position, direction, and the like of a reference image (anchor) detected from the shot image in a virtual three-dimensional space, and displays the virtual object indicative of the registration information setting point on the basis of the calculated positional relationship and a change in the context.

14 Claims, 20 Drawing Sheets

(51) Int. Cl.
*G06T 19/00* (2011.01)
*G06F 3/01* (2006.01)
*G06T 3/00* (2006.01)
*H04N 5/232* (2006.01)

(52) U.S. Cl.
CPC ............ *G06T 3/0068* (2013.01); *G06T 19/00* (2013.01); *H04N 5/23216* (2013.01); *H04N 5/23293* (2013.01)

(56) References Cited

U.S. PATENT DOCUMENTS

| | | | |
|---|---|---|---|
| 2006/0190812 A1* | 8/2006 | Ellenby | G06F 17/30259 715/209 |
| 2011/0052083 A1* | 3/2011 | Rekimoto | H04N 1/00244 382/218 |
| 2014/0168268 A1* | 6/2014 | Oi | G06T 19/006 345/633 |

FOREIGN PATENT DOCUMENTS

| JP | 2011-028763 A | 2/2011 |
|---|---|---|
| JP | 2011-055250 A | 3/2011 |
| JP | 2012-128779 A | 7/2012 |
| JP | 2013-027628 A | 2/2013 |
| JP | 2013-105346 A | 5/2013 |

* cited by examiner

FIG. 3 (A) REAL WORLD (Real World)

FIG. 3 (B) DISPLAY IMAGE

FIG. 6

| BEACON TRANSMITTER IDENTIFIER (ID) | URL FOR ACQUIRING BEACON TRANSMITTER NEIGHBORING FACILITY INFORMATION |
|---|---|
| 011abxxxx23c | http//www.abcdef-xxx.co.pp |
| 1211dxxxx43a | http//www.xyzaaa-yyy.co.tt |
| .. | .. |
| 352axxxx22f | http//www.pqrgge-zzz.co.qq |
| .. | .. |

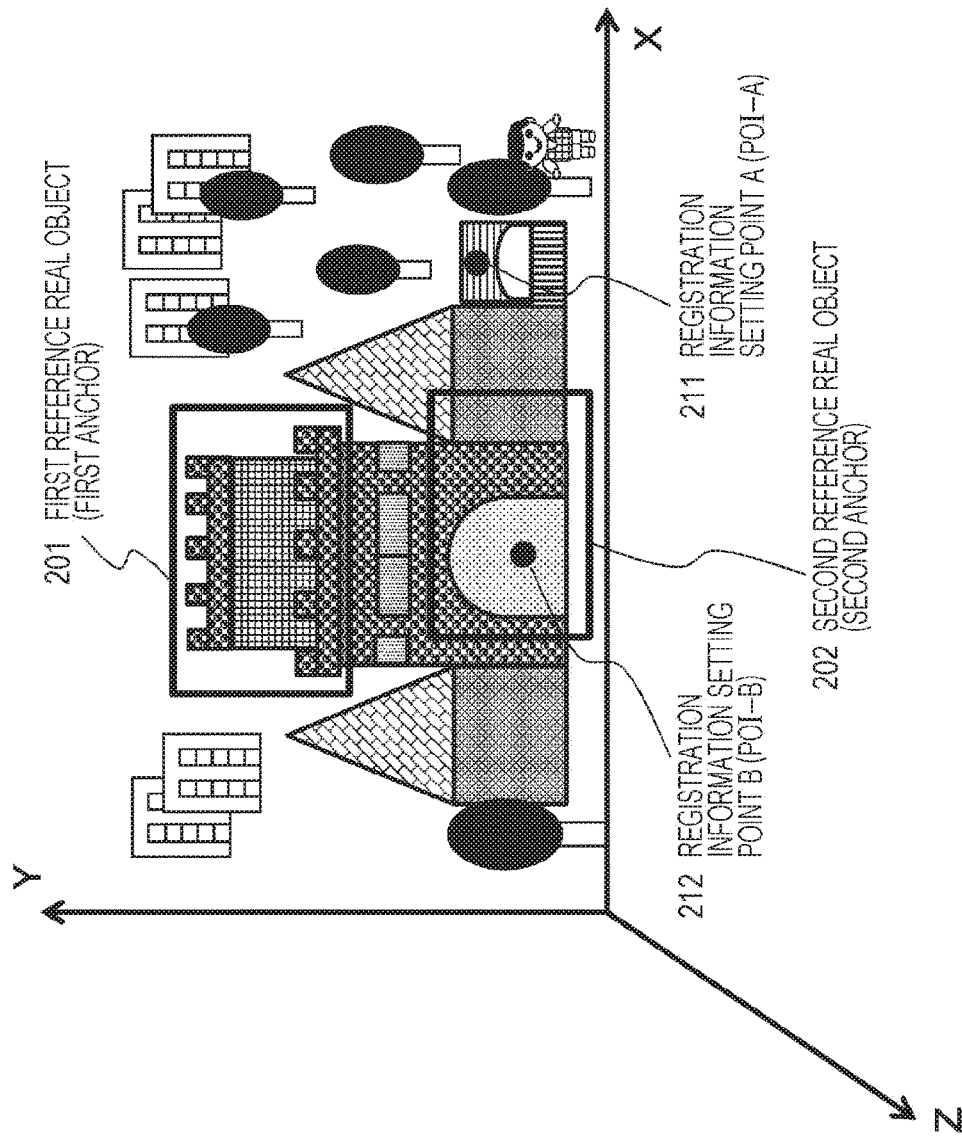
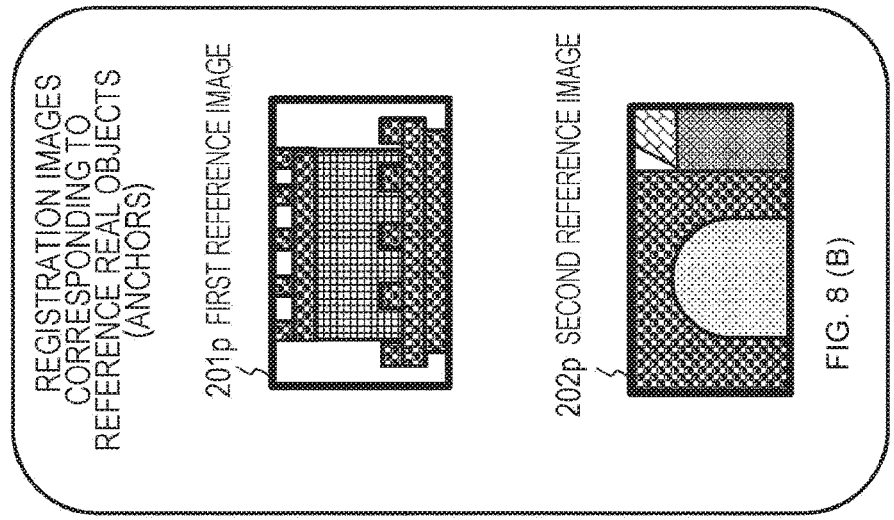

FIG. 8 (A) REAL OBJECTS ON 3D SPATIAL COORDINATE SYSTEM IN REAL WORLD

201 FIRST REFERENCE REAL OBJECT (FIRST ANCHOR)
202 SECOND REFERENCE REAL OBJECT (SECOND ANCHOR)
211 REGISTRATION INFORMATION SETTING POINT A (POI-A)
212 REGISTRATION INFORMATION SETTING POINT B (POI-B)

REGISTRATION IMAGES CORRESPONDING TO REFERENCE REAL OBJECTS (ANCHORS)

201p FIRST REFERENCE IMAGE
202p SECOND REFERENCE IMAGE

FIG. 8 (B)

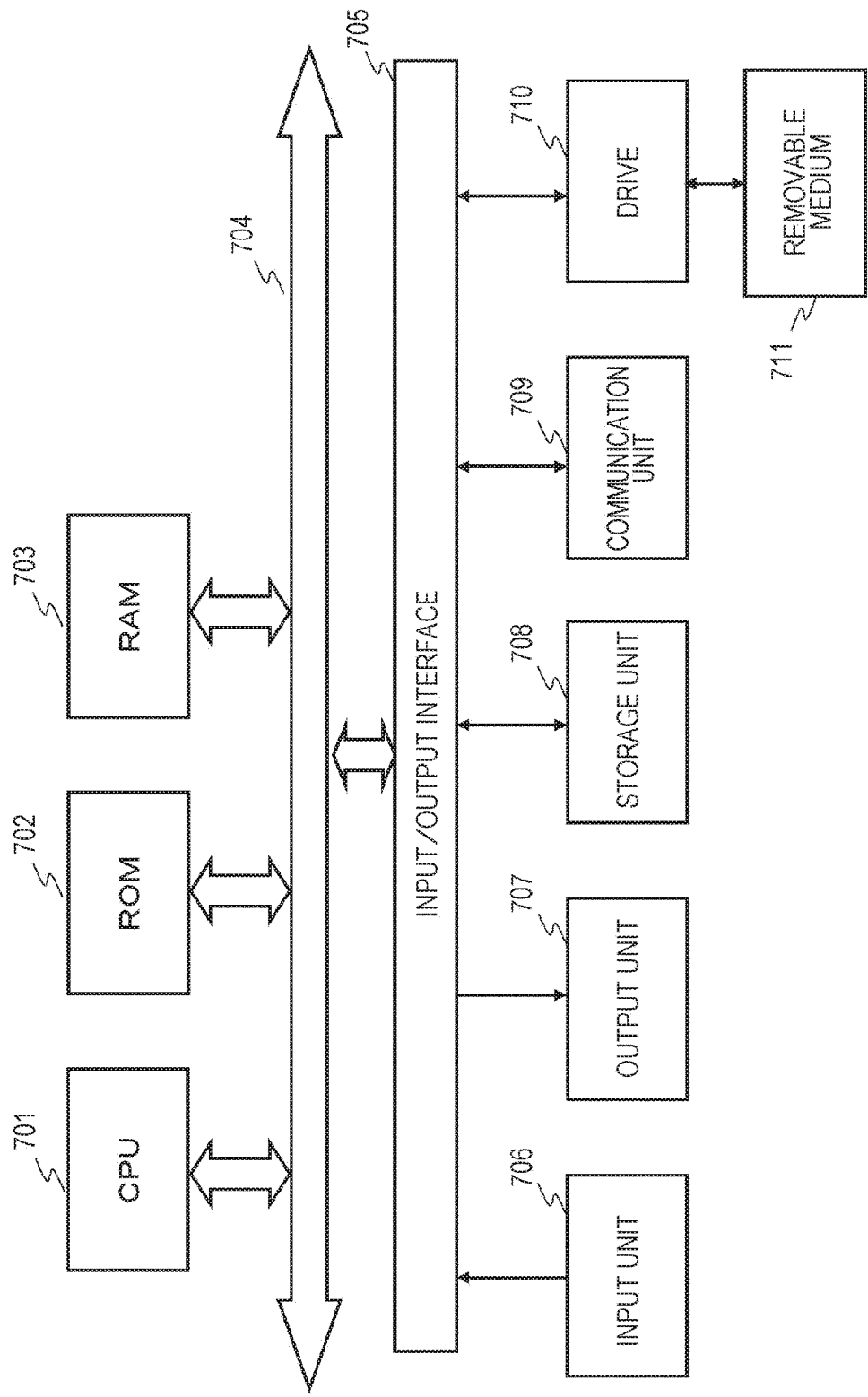

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/064895 filed on May 25, 2015, which claims priority benefit of Japanese Patent Application No. JP 2014-158133 filed in the Japan Patent Office on Aug. 1, 2014. Each of the above-referenced applications is hereby incorporated herein by reference in its entirety.

TECHNICAL FIELD

The present disclosure relates to an information processing apparatus, an information processing method, and a program. More specifically, the present disclosure relates to an information processing apparatus, an information processing method, and a program by which to display information on real objects existing in the vicinity of the information processing apparatus on a display unit (display) on the basis of the position and direction of the information apparatus.

BACKGROUND ART

Recently, smart phones, tablet terminals, or wearable terminals such as an eyeglass-type display, and the like have become widespread and these terminals are utilized by a large number of users.

Most of these terminals include not only the communication function but also the camera function by which to display shot images on display units. In addition, the display units are capable of displaying not only the shot images but also various kinds of information received via networks such as web pages accessed via networks, for example.

Further, there are terminals capable of acquiring information associated with positional information from web sites and displaying the same in accordance with geostationary earth orbit (Geo) information set as attribute information on camera-shot images and positional information acquired by the global positioning system (GPS) function of mobile terminals, for example.

Besides, Patent Document 1 (Japanese Patent Application Laid-Open No. 2011-028763) discloses a configuration in which such information related to shot images is superimposed and displayed on the shot images, for example.

CITATION LIST

Patent Document

Patent Document 1: Japanese Patent Application Laid-Open No. 2011-028763

SUMMARY OF THE INVENTION

Problems to be Solved by the Invention

There are many conventional techniques for configurations that allow the related information on shot objects to be superimposed and displayed on a terminal on the basis of the positional information such as GPS and Geo information.

By using data in which registration information on various facilities is accurately associated with the positions of the facilities to detect the position and inclination of the user terminal shooting and displaying objects and perform a control to move the related information in synchronization with the movement of the object on the display unit, it is possible to superimpose and display the registration information in accordance with the positions of the facilities.

However, according to the conventional methods, the related information is superimposed and displayed on the shot video, following the positional relationship between the Geo positional information in the information apparatus and the Geo positional information in the registration information and the position of an subject recognized in the video shot by the camera on the shot video, by a program in the information processing apparatus. Accordingly, the size and color of text superimposed and displayed in accordance with metadata in the registration information can be changed. However, it is difficult to change the registration information to be displayed with user behavior, the context (situations) of the information terminal, or a change in the behavior or the context as a trigger, and control the display method (the size and position of the characters, animation, and others).

For example, it is difficult to perform flexible processes on the basis of the user physical information (heartbeat, pulse, and the like) obtained from the sensor in the information terminal and the information from the temperature sensor such that, when there is an isotonic drink vending machine in the vicinity of the information terminal, although it is not seen in the camera-shot video, the registration information related to the vending machine is displayed to encourage the user to drink liquid.

The present disclosure is devised in light of the foregoing problem, for example, to display information on a registered and set real-world point (point of interest (POI)) at the occurrence of an event in accordance with the context (situations) determined from the positional relationship between the user terminal such as a smart phone and the position of the point and various kinds of information obtained from the user terminal as a trigger. For example, an object of the present disclosure is to provide an information processing apparatus, an information processing method, and a program by which to allow information display in various manners such that, when the position and inclination of the user terminal are changed in accordance with the user's motion and the like, the status of the user behavior (walking, running, riding a train, or the like) is considered in addition to the amount of the change to change the information to be displayed and the method of display (the size and display position of the text).

Solutions to Problems

A first aspect of the present disclosure is an information processing apparatus including: an imaging unit; a display unit that displays an image shot by the imaging unit; and a data processing unit that displays on the display unit a virtual object including registration information on a real-world registration information setting point included in the shot image, wherein the data processing unit inputs virtual object display control data that records an anchor as a reference image of a real object shot in a real world, and positional information on the anchor and positional information on the registration information setting point in a virtual three-dimensional spatial coordinate system, and performs a process for displaying the registration information described in the display control data or a process for updating the display with detection of an event in accordance with a change in predefined context as a trigger, and the data processing unit displays the virtual object indicative of the registration information setting point in conjunction with the display of the registration information.

Further, a second aspect of the present disclosure is an information processing method executed by an information processing apparatus, wherein the information processing apparatus includes an imaging unit, a display unit that displays an image shot by the imaging unit, and a data processing unit that displays on the display unit a virtual object including registration information on a real-world registration information setting point included in the shot image, the data processing unit inputs virtual object display control data that records an anchor as a reference image of a real object shot in a real world, and positional information on the anchor and positional information on the registration information setting point in a virtual three-dimensional spatial coordinate system, and performs a process for displaying the registration information described in the display control data or a process for updating the display with detection of an event in accordance with a change in predefined context as a trigger, and the data processing unit displays the virtual object indicative of the registration information setting point in conjunction with the display of the registration information.

Further, a third aspect of the present disclosure is a program for causing an information processing apparatus to execute information processing, wherein the information processing apparatus includes an imaging unit, a display unit that displays an image shot by the imaging unit, and a data processing unit that displays on the display unit a virtual object including registration information on a real-world registration information setting point included in the shot image, and the program causes the data processing unit to: input virtual object display control data that records an anchor as a reference image of a real object shot in a real world, and positional information on the anchor and positional information on the registration information setting point in a virtual three-dimensional spatial coordinate system; perform a process for displaying the registration information described in the display control data or a process for updating the display with detection of an event in accordance with a change in predefined context as a trigger; and display the virtual object indicative of the registration information setting point in conjunction with the display of the registration information.

Incidentally, the program of the present disclosure is a program that can be provided by a storage medium or a communication medium in a computer-readable form to an information processing apparatus or a computer system capable of executing various program codes, for example. By providing the program in the computer-readable form, processes according to the program are implemented on the information processing apparatus or the computer system.

Still other objects, features, and advantages of the present disclosure will be clarified by more detailed explanations with reference to examples of the present disclosure described later and the accompanying drawings. Incidentally, the system described herein is a logical assembly of a plurality of apparatuses but the apparatuses as constituent elements may not be contained in the same housing.

Effects of the Invention

According to a configuration of an example of the present disclosure, it is possible to achieve an apparatus and a method by which to perform a process for displaying registration information on a real-world registration information setting point and a process for updating the display with detection of an event in accordance with a change in the context as a trigger.

Specifically, a control for displaying a virtual object including registration information on a real-world registration information setting point is performed. The data processing unit performs a process for displaying registration information described in control data and a process for updating the display in accordance with a change in predefined context. Further, the data processing unit displays the virtual object indicative of the registration information setting point in conjunction with the display of the registration information. The data processing unit calculates the positional relationship between the information processing apparatus and the registration information setting point on the basis of the position, direction, and the like of a reference image (anchor) detected from the shot image in a virtual three-dimensional space, and displays the virtual object indicative of the registration information setting point on the basis of the calculated positional relationship and a change in the context.

According to this configuration, it is possible to achieve an apparatus and a method by which to perform a process for displaying registration information on a real-world registration information setting point and a process for updating the display with detection of an event in accordance with a change in the context as a trigger.

Incidentally, the advantageous effects described herein are not limited ones but mere examples, and the present disclosure may have additional advantageous effects.

BRIEF DESCRIPTION OF DRAWINGS

FIG. 6 is a diagram describing a configuration example of data retained in a search server.

FIGS. 8(a) and 8(b) are diagrams describing reference real objects and registration information setting points.

FIG. 20 is a diagram illustrating a configuration example of a server.

MODE FOR CARRYING OUT THE INVENTION

Figure 1:
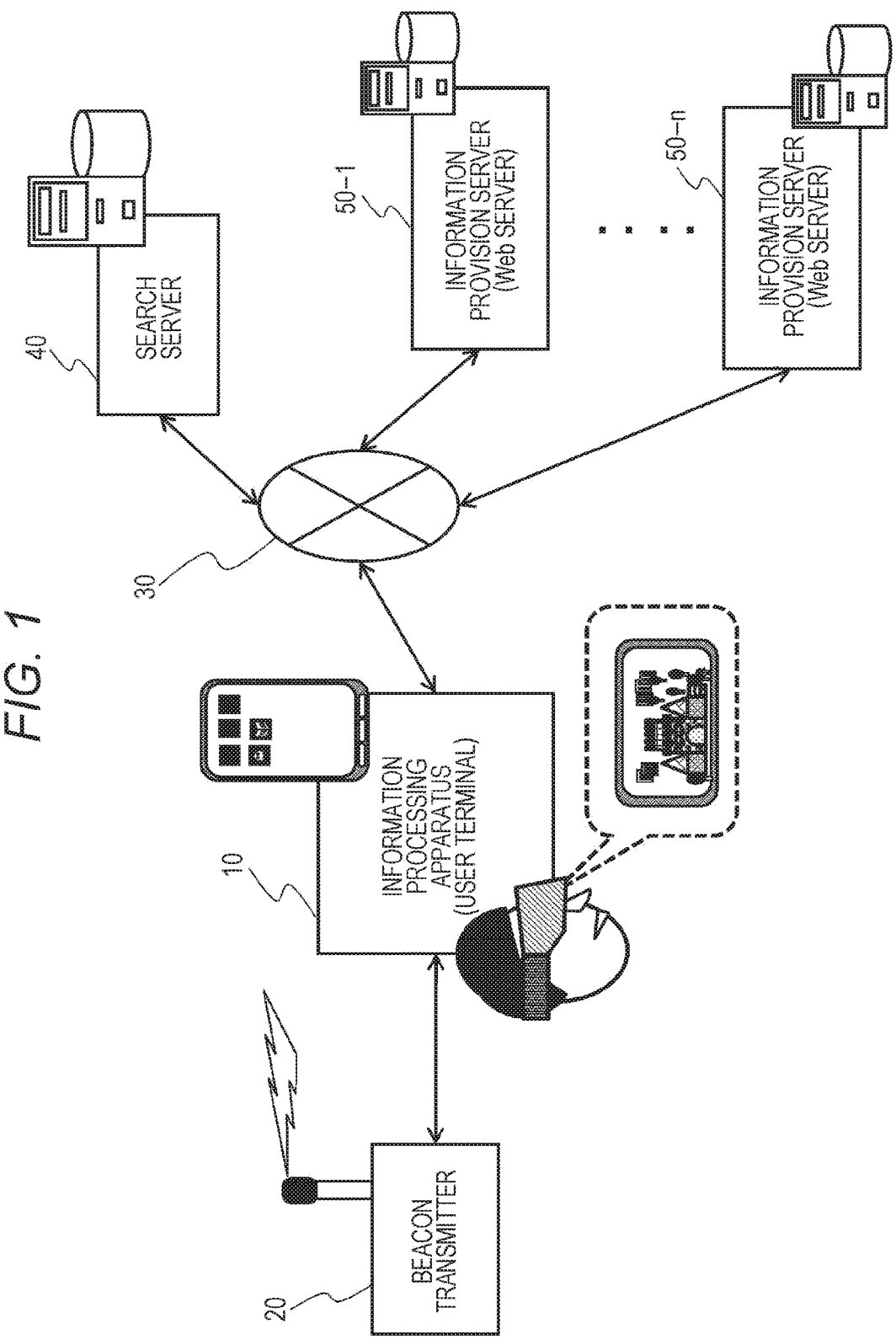
FIG. 1 is a diagram describing a configuration example of a system including an information processing apparatus (user terminal) executing processes of the present disclosure.

An information processing apparatus, an information processing method, and a program of the present disclosure will be explained below in detail with reference to the drawings. Incidentally, the explanations will be given in the following order:

1. About configuration examples of the information processing apparatus of the present disclosure and a system including the information processing apparatus 2. About the details of a communication process and an image display process 3. About a process for deciding the display positions of registration information setting point (POI) position identification marks 4. About the sequence of processes executed by the information processing apparatus 4-1. Process for acquiring virtual object display control data and displaying virtual objects 4-2. Process for setting a positioning process object 4-3. Process for displaying virtual objects based on the detection of a virtual object display event 4-4. Process for three-dimensional position determination 5. About events as triggers for starting display of virtual objects or updating display 6. About configuration examples of the information processing apparatus and the server 7. Summary of a configuration of the present disclosure

[1. About Configuration Examples of the Information Processing Apparatus of the Present Disclosure and a System Including the Information Processing Apparatus]

First, configuration examples of the information processing apparatus of the present disclosure and a system including the information processing apparatus will be explained with reference to FIG. 1.

FIG. 1 is a diagram illustrating a configuration example of a communication system including the information processing apparatus of the present disclosure.

An information processing apparatus (user terminal) 10 is a communication terminal capable of being carried by a user such as a smart phone or an eyeglass-type terminal, for example.

The information processing apparatus (user terminal) 10 includes a communication unit, a camera (imaging unit), and a display unit, and has the functions of displaying a camera-shot image on the display unit, and superimposing and displaying information received via the communication unit on the shot image on the display unit.

The information processing apparatus 10 displays the camera-shot image on the display unit. The display image on the display unit is a real-time shot image that is currently shot by the camera. Incidentally, the processes of the present disclosure are applicable to the case in which an image previously shot and stored in a memory is read and displayed on the display unit. However, in the example described below, the currently shot image is displayed on the display unit. Incidentally, the shot image may or may not be recorded in a storage unit such as a medium.

The camera (imaging unit) and the display unit of the information processing apparatus 10 may be implemented by different devices and configured to operate integrally via communications.

The configuration in which they operate integrally via communications can be implemented such that moving images shot by the camera (imaging unit) attached to the head of the user, and position and direction information are transmitted to the smart phone (display unit) via Wi-Fi, for example.

The processes of the present disclosure are also applicable to both the case in which the information processing apparatus 10 is one physical apparatus and the case in which the information processing apparatus 10 is formed by a plurality of devices via communications.

While displaying the shot image on the display unit, the information processing apparatus 10 receives a beacon output from a beacon transmitter 20 composed of an access point (AP) in a wireless LAN or Bluetooth, for example.

The beacon is a packet storing an identifier (ID) of the beacon transmitter 20.

The information processing apparatus 10 transfers the beacon received from the beacon transmitter 20 to a search server 40 via a network 30 such as the Internet.

Upon receipt of the beacon transferred from the information processing apparatus 10, the search server 40 acquires access information (URL) registered in correspondence with the beacon transmitter identifier (ID) included in the received beacon on the basis of the identifier, and transmits the same to the information processing apparatus 10.

The access information (URL) is access information for acquiring positional information on information registration points near the beacon transmitter 20, and data including registration information, and the like.

Incidentally, in map data provided on web pages, for example, registration information setting points (points of interest (POIs)) are set as points estimated to attract interest from many people such as tourist spots and landmarks. The access information (URL) is access information for acquiring display control data including positional information on the registration information setting points (POIs), registration information, and the like.

The information processing apparatus 10 uses the access information (URL) to acquire the display control data from an information provision server 50, and superimposes and displays the registration information and the like corresponding to the registration information setting points (POIs) included in the acquired display control data on the shot image on the display unit.

That is, the information processing apparatus 10 superimposes and displays the positional information on the POIs acquired from the information provision server 50 and the registration information as virtual objects on the real objects shot by the camera (imaging unit) and displayed on the display unit.

The information provision server 50 provides POI display control data such as positional information on various facilities in various positions in regions and guide information on the facilities. The information provision server 50 includes a database in which the registration information is registered, and generates the display control data on the basis of the database information. The information provision server 50 returns the relevant display control data in accordance with the URL included in a request from the information terminal 10.

The information processing apparatus 10 uses the access information (URL) selected by the search server 40 to acquire the POI display control data from the information provision server 50.

The information processing apparatus 10 uses the POI display control data to superimpose and display the POI positions and the registration information on various facilities near the installation place of the beacon transmitter 20 on the camera-shot image displayed on the display unit.

A specific process example will be explained with reference to FIGS. 2(*a*) and 2(*b*).

Figure 2:
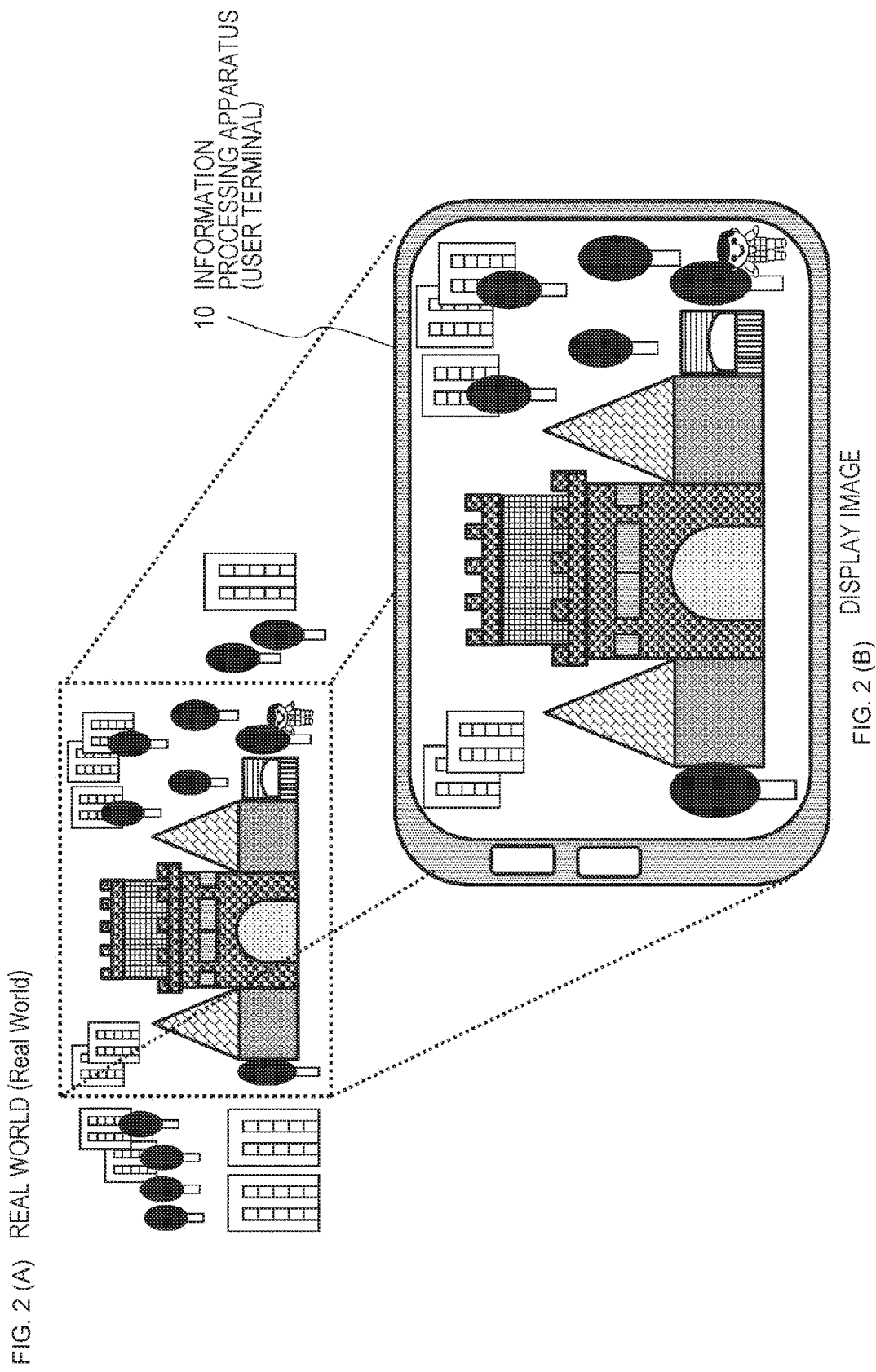
FIGS. 2(a) and 2(b) are diagrams describing a display image example on a display unit of the information processing apparatus (user terminal).

FIGS. 2(*a*) and 2(*b*) illustrate a display example of a camera-shot image on the display unit by the information processing apparatus (user terminal) 10.

Incidentally, in the following description, a smart phone is taken as an example of the information processing apparatus (user terminal) 10. However, the example explained below can also be carried out on various user terminals other than a smart phone, such as a tablet terminal, a PC, an eyeglass-type terminal, or the like, for example.

FIG. 2(*a*) illustrates a landscape in a real world that includes a castle in a tourist spot. The user carrying the information processing apparatus (user terminal) 10 visits the castle in the tourist spot and sees the landscape illustrated in FIG. 2(*a*).

The user uses the camera function of the information processing apparatus (user terminal) 10 to shoot (*a*) a real-world image and display the shot image on the display unit.

The shot image displayed on the display unit is a display image illustrated in FIG. 2(*b*).

For example, in this state, the series of processes explained above with reference to FIG. 1 is executed. That is, the following steps (S01 to S04) are performed:

(S01) The information processing apparatus 10 transfers to the search server 40 the identification information (ID) on the beacon received from the beacon transmitter 20 such as a close access point (AP) in the real world illustrated in FIG. 2(*a*).

(S02) The search server 40 transmits to the information processing apparatus 10 the access information (URL) for acquiring the data including the registration information on the neighborhood of the beacon transmitter 20 on the basis of the identification information.

(S03) The information processing apparatus 10 uses the access information (URL) received from the search server 40 to acquire from the information provision server 50 the display control data such as the positional information and the registration information on the facilities near the beacon transmitter 20.

(S04) The information processing apparatus 10 uses the display control data such as the positional information and the registration information on the facilities near the beacon transmitter 20 acquired from the information provision server 50 to superimpose and display marks indicative of the positions of the facilities and the registration information as virtual objects on the shot image displayed on the display unit.

The foregoing series of steps is performed.

Figure 3:
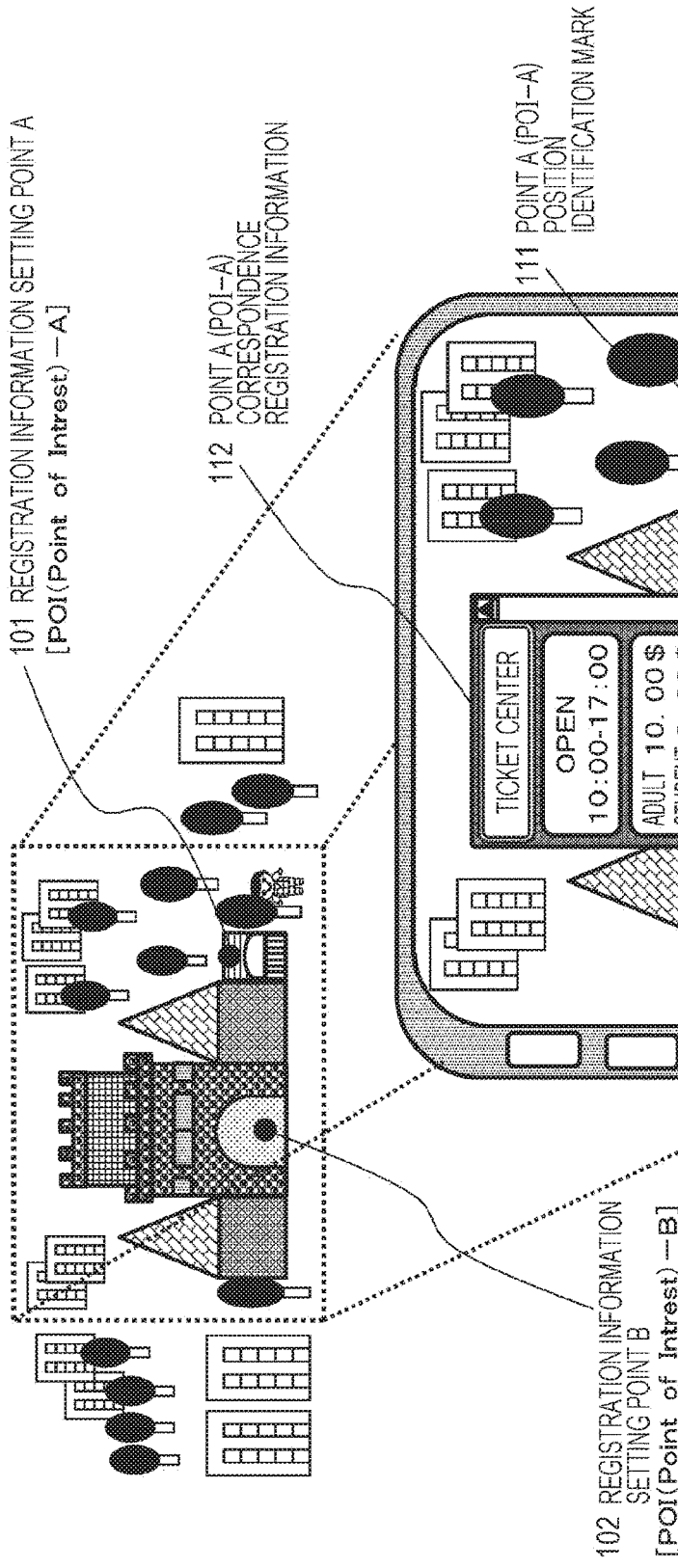
FIGS. 3(a) and 3(b) are diagrams describing a display image example on the display unit of the information processing apparatus (user terminal).

As a result of the execution of the foregoing series of steps, FIGS. 3(*a*), 3(*b*), 4(*a*), and 4(*b*) illustrate examples of display images displayed on the display unit of the information processing apparatus 10.

FIG. 3(*a*) illustrates a landscape in the real world as in the case of FIG. 2(*a*) explained above, and FIG. 3(*b*) illustrates a display image displayed on the display unit of the information processing apparatus 10 after the execution of the foregoing series of steps (S01 to S04).

At step S03, the data acquired from the information provision server 50, that is, the display control data such as the positional information and the registration information on the facilities near the beacon transmitter 20 includes information on the following two points in the real world illustrated in FIG. 3(*a*):

(1) Positional information and registration information on a registration information setting point A (POI-A) 101

(2) Positional information and registration information on a registration information setting point B (POI-B) 102

The display image illustrated in FIG. 3(*b*) is a display image displayed with selection of (1) the positional information and registration information on registration information setting point A (POI-A) 101.

The display image illustrated in FIG. 3(*b*) is an image in which virtual objects described in the display control data acquired from the information provision server 50 are superimposed and displayed on the real object as the shot image.

The displayed virtual objects are the following data:

(1) Point A (POI-A) position identification mark 111

(2) Point A (POI-A) correspondence registration information 112

These data are displayed as virtual objects.

As described above, the display image illustrated in FIG. 3(*b*) is an image in which virtual objects generated on the basis of the display control data acquired from the information provision server 50 are superimposed and displayed on the real object as the shot image, that is, an augmented reality (AR) image.

The point A is a ticket center. The point A (POI-A) position identification mark 111 as a virtual object is superimposed and displayed in the position of the ticket center in the shot image as the real object.

The display position of the point A (POI-A) position identification mark 111 needs to be set on the ticket center in the shot image as the real object. This display position is decided by the information processing apparatus 10 with the use of the data acquired from the information provision server. Incidentally, the image displayed on the information processing apparatus 10 is a real-time camera-shot image that changes in accordance with the motion of the user. The display position of the point A (POI-A) position identification mark 111 also needs to be updated in accordance with the motion of the displayed shot image (real object). The display position control is also executed by the information processing apparatus 10.

Under the display control executed by the information processing apparatus 10, the display position of the point A (POI-A) position identification mark 111 as a virtual object is correctly placed on the ticket center in the shot image as the real object.

The specific steps of the display control will be described later.

Further, the point A (POI-A) correspondence registration information 112 as another virtual object is also superimposed and displayed on the shot image as the real object.

The point A (POI-A) correspondence registration information 112 includes various kinds of information on the ticket center corresponding to the registration information setting point A. As illustrated in the drawing, information on the opening hours and fees at the ticket center and the like is displayed. The information is recorded in the database of the information provision server 50, and is included in the display control data acquired in accordance with the URL provided by the search server 40 or is acquired on the basis of the display control data.

Figure 4:
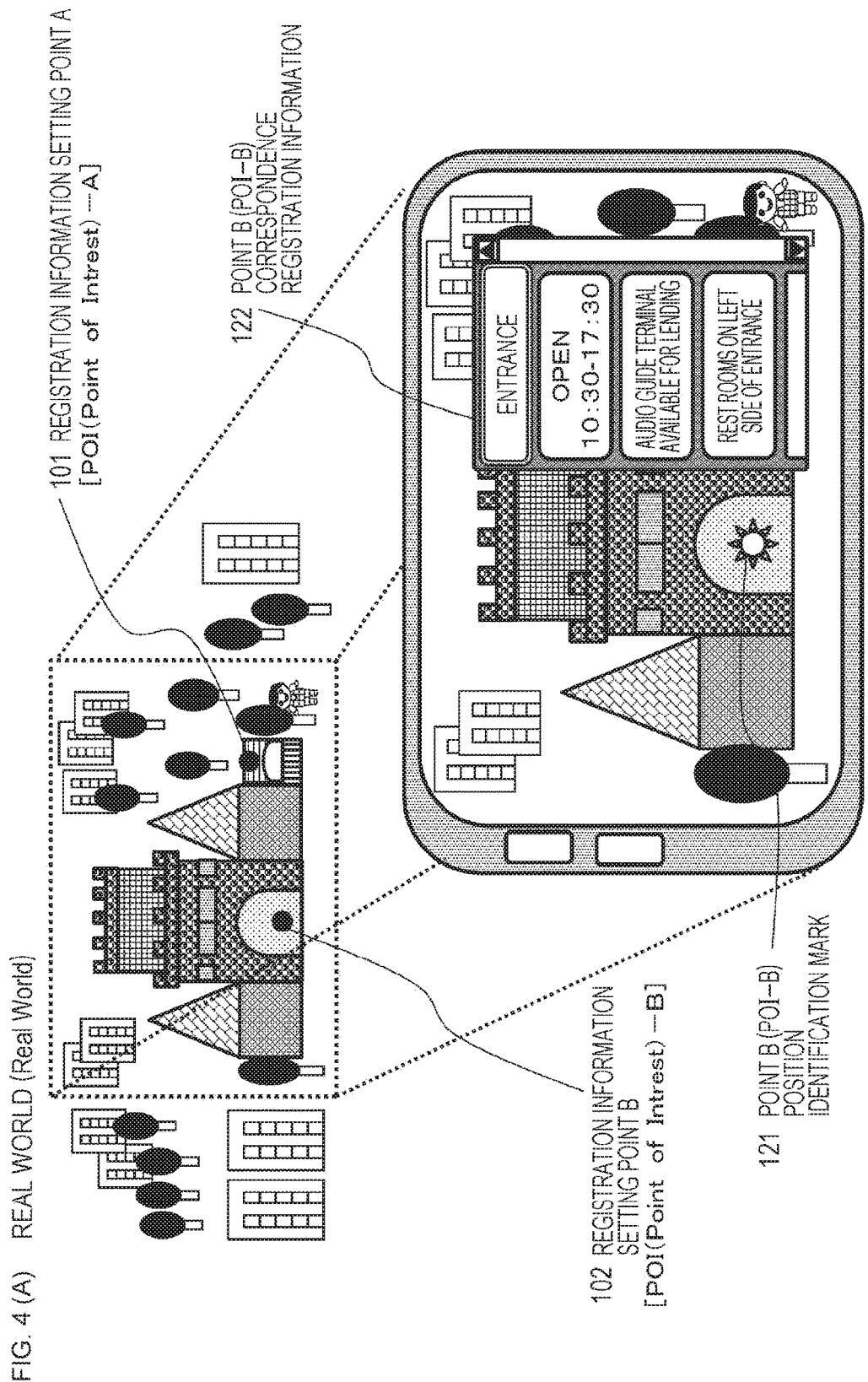
FIGS. 4(a) and 4(b) are diagrams describing a display image example on the display unit of the information processing apparatus (user terminal).

FIGS. 4(*a*) and 4(*b*) are diagrams illustrating a display image example with the use of information on another point B, that is:

(2) Positional information and registration information on the registration information setting point B (POI-B) 102.

FIG. 4(*a*) illustrates a landscape in the real world, and FIG. 4(*b*) illustrates a display image displayed on the display unit of the information processing apparatus 10 after the execution of the foregoing series of steps (S01 to S04).

The display image illustrated in FIG. 4(*b*) is an image in which virtual objects as display data acquired from the information provision server 50 are superimposed and displayed on the real object as the shot image.

The virtual objects displayed are the following data:
(1) Point B (POI-B) position identification mark 121
(2) Point B (POI-B) correspondence registration information 122

These data are displayed as virtual objects.

As described above, the display image illustrated in FIG. 4(*b*) is an image in which the virtual objects generated on the basis of the data acquired from the information provision server 50 are superimposed and displayed on the real object as the shot image, that is, an augmented reality (AR) image.

The point B represents an entrance to the castle, and the point B (POI-B) position identification mark 121 is superimposed and displayed as a virtual object on the shot image as the real object at the entrance position.

The display position of the point B (POI-B) position identification mark 121 needs to be set on the entrance to the castle in the shot image as the real object. The display position is decided and controlled by the information processing apparatus 10 with the use of the data acquired from the information provision server. Specifically, the information processing apparatus 10 updates the display position of the point B (POI-B) position identification mark 121 in accordance with the motion of the shot image (real object) displayed on the display unit.

Under the display control executed by the information processing apparatus 10, the display position of the point B (POI-B) position identification mark 121 as a virtual object is always set on the entrance in the shot image as the real object.

The specific steps of the display control will be described later.

Further, the point B (POI-B) correspondence registration information 122 as another virtual object is also superimposed and displayed on the shot image as the real object.

The point B (POI-B) correspondence registration information 122 includes various kinds of information on the castle entrance corresponding to the registration information setting point B. As illustrated in the drawing, information such as the opening hours of the entrance, information on lending of guide terminals, rest room positional information, and others is displayed. The information is recorded in the database of the information provision server 50 and acquired in accordance with the URL provided by the search server 40.

[2. About the Details of a Communication Process and an Image Display Process]

Figure 5:
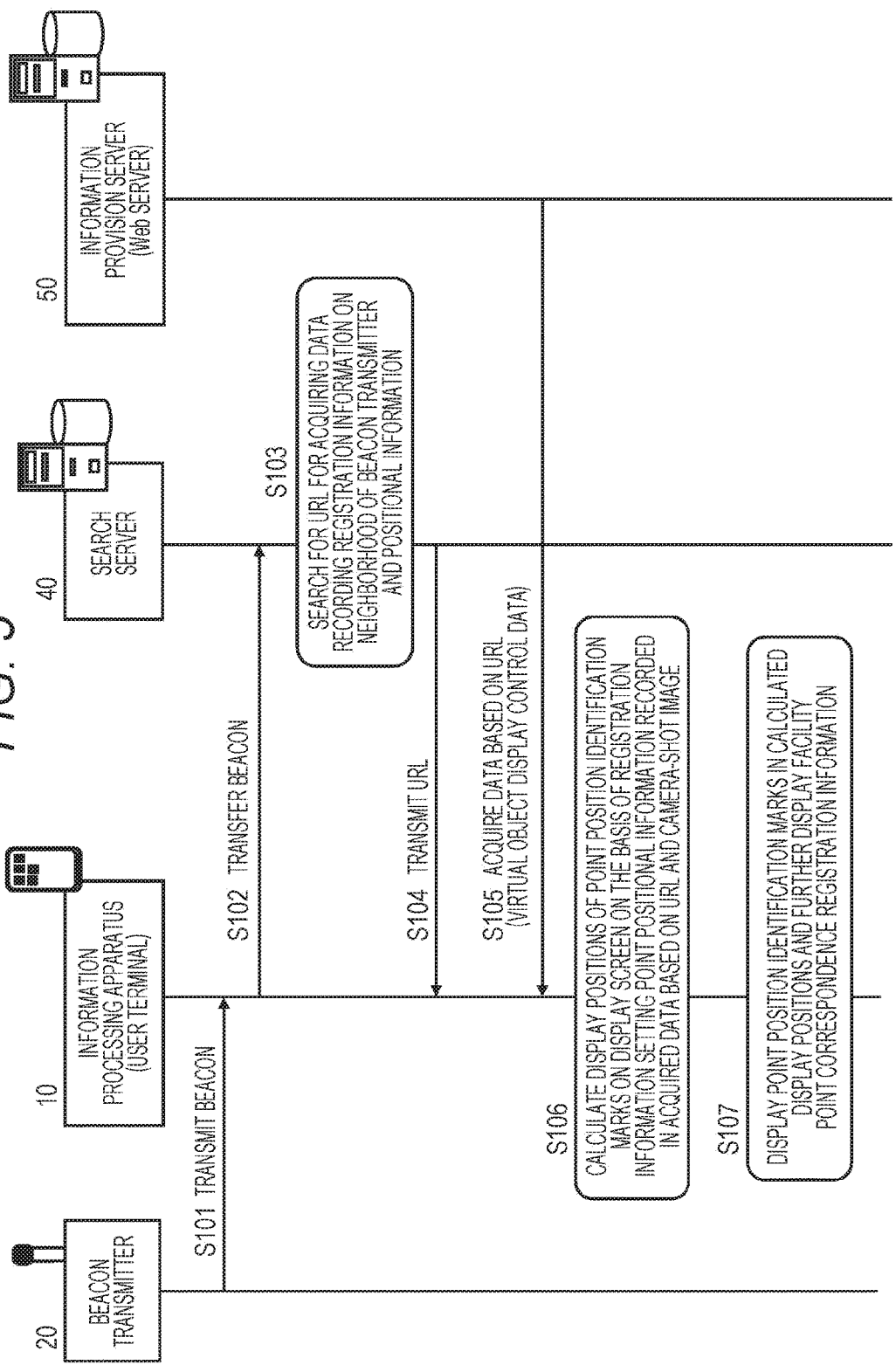
FIG. 5 is a diagram describing a process sequence between constituent elements of the system including the information processing apparatus (user terminal) executing the processes of the present disclosure.

FIG. 5 is a sequence diagram describing a communication sequence executed between the apparatuses illustrated in FIG. 1 and a display process sequence of an augmented reality image (superimposed image of real object and virtual objects) executed by the information processing apparatus (user terminal) 10.

FIG. 5 illustrates the beacon transmitter 20, the information processing apparatus (user terminal) 10, the search server 40, and the information provision server 50 from the left side.

The process steps will be explained below in sequence.
(Step S101)

First, at step S101, the beacon transmitter 20 outputs a beacon and the information processing apparatus 10 receives the beacon. As described above, the beacon is a packet storing the identifier (ID) of the beacon transmitter 20 and the like.
(Step S102)

The information processing apparatus 10 transfers the beacon received from the beacon transmitter 20 to the search server 40.
(Step S103)

The search server 40 receives the beacon transferred from the information processing apparatus 10, and searches the database on the basis of the identifier (ID) of the beacon transmitter 20 included in the beacon to extract access information (URL) for acquiring the data including the registration information on the neighborhood of the beacon transmitter 20.

FIG. 6 illustrates an example of data stored in the database of the search server 40. The search server 40 stores data as described in FIG. 6 in the database (storage unit), for example.

The data illustrated in FIG. 6 is composed of a correspondence list of the following two data:
Beacon transmitter identifier (ID); and
URL for acquiring beacon transmitter neighborhood facilities information.

The search server 40 receives the beacon transferred from the information processing apparatus 10, and searches the list of the data configuration described in FIG. 6, for example, on the basis of the identifier (ID) of the beacon transmitter 20 included in the beacon.

By the list search, the search server 40 acquires the access information (URL) associated with the identifier (ID) of the beacon transmitter 20 included in the beacon transferred from the information processing apparatus 10.

The access information (URL) is access information (URL) for acquiring the data including the registration information on the neighborhood of the beacon transmitter 20.
(Step S104)

Next, at step S104, the search server 40 transmits to the information processing apparatus 10 the access information (URL) acquired by the search at step S103.
(Step S105)

The information processing apparatus 10 uses the access information (URL) received from the search server 40 to acquire the data including the positional information and registration information on the facilities near the beacon transmitter 20 (virtual object display control data) from the information provision server 50.

The data transmitted from the information provision server 50 to the information processing apparatus 10 includes real-state data on virtual objects to be superimposed and displayed on the camera-shot image as the real object displayed on the display unit of the information processing apparatus 10 and display control information for the real-state data. The data will be hereinafter called virtual object display control data.

The virtual object display control data is specifically composed of the following data and the like:
(1) hyper text markup language (HTML)
(2) cascading style sheet (CSS)
(3) JavaScript (registered trademark).

The HTML is data indicative of a basic structure of the virtual objects displayed on the display unit of the information processing apparatus 10. Although there are various kinds of HTML data, HTML 5 is usable, for example.

The CSS is a style sheet that defines the display formats, colors, shapes, and others of the virtual object configuration data defined by the HTML, which is data defining the style of the virtual objects displayed on the display unit of the information processing apparatus 10.

The JavaScript (registered trademark) is a display control program that defines the process for displaying the virtual objects, the process for updating the display, or the process for moving and updating the virtual objects. For example, it is a display control program for executing display controls such as taking various actions on the displayed information including changing the display mode of the virtual objects, with such events as touch and click on a display object by the user or events detected in accordance with various contexts (situations) such as a lapse of a predetermined period of time as triggers.

As described above, the information provision server 50 provides the information processing apparatus 10 with the virtual object display control data having the following data:
(1) hyper text markup language (HTML)
(2) cascading style sheet (CSS)
(3) JavaScript (registered trademark)

The virtual object display control data is data acquired by one URL, and the HTML is acquired in accordance with the access information (URL) selected by the search server 40 on the basis of the beacon transmitter identifier (ID) included in the beacon from the beacon transmitter 20. Further, CSS and JavaSciript referred to by the HTML are acquirable.

That is, the virtual object display control data having HTML, CSS, and JavaScript (registered trademark) as components includes the positional information and guide information on various facilities near one specific beacon transmitter 20 in a real-world three-dimensional space, and is used to display the virtual objects such as the point (POI) position identification marks and the point correspondence registration information explained above with reference to FIGS. 3(*a*), 3(*b*), 4(*a*), and 4(*b*) and perform display controls.

The details of the data will be explained later.

(Step S106)

The information processing apparatus 10 uses the positional information on the registration information setting points recorded in the data acquired from the information provision server 50 (virtual object display control data) on the basis of the URL at step S106 and the camera-shot image to calculate the display positions of the point position identification marks on the display screen.

That is, as explained above with reference to FIGS. 3(*a*), 3(*b*), 4(*a*), and 4(*b*), the information processing apparatus 10 performs a display position decision process to display the point position identification marks as virtual objects in accordance with the real objects such as the ticket center, the entrance, and the like as registration information setting points in the shot image as the real object.

In the display position decision process, the positional information on the anchors as pre-shot reference images and the registration information setting points in the virtual three-dimensional space recorded in the data acquired from the information provision server 50 (the virtual object display control data), and the camera shot image are used.

The specific steps of the display position decision process will be described later.

(Step S107)

Finally, at step S107, the information processing apparatus 10 displays the point position identification marks in the display positions calculated at step S106, and further displays the facility point correspondence registration information.

The display result is (b) the display image explained above with reference to FIGS. 3(*a*), 3(*b*), 4(*a*), and 4(*b*), for example.

Incidentally, in the foregoing process example, the search server 40 provides the access information (URL) for acquiring the information on the neighborhood of the beacon device 20 on the basis of the beacon transferred from the information processing apparatus 10. Alternatively, the search server 40 may be configured to use data other than the beacon.

For example, a thumbnail as a reduced version of an image shot by the information processing apparatus 10 and image feature amount data may be transmitted to the search server 40 such that the search server 40 can determine the position corresponding to the thumbnail and the image feature amount data and provide the access information (URL) for acquiring the display control data for the information on the neighborhood of the determined position.

In this case, the search server 40 is configured to store a correspondence list of the shot images of various locations and the access information in the storage unit. In addition, the shot images are not limited to the images of locations but the images of books or posters. On the basis of the data received from the information processing apparatus 10, the search server 40 selects the shot image including the image matching the data from the correspondence list in the storage unit, and provides the access information (URL) for the POI display control data set in correspondence with the image to the information processing apparatus 10.

Alternatively, the information processing apparatus 10 may read markers or QR codes (registered trademark) recorded in facilities in various locations and transmit the read data to the search server 40 so that the search server 40 can search the database on the basis of the received data and provide the access information (URL) for acquiring the information on the neighborhood of the positions where the received markers or QR codes (registered trademark) are recorded.

In this case, the search server 40 stores a correspondence list of the markers or QR codes (registered trademark) recorded in various locations and access information in the storage unit, performs a data search based on the markers or QR codes (registered trademark) received from the information processing apparatus 10, and provides the information processing apparatus 10 with the access information (URL) recorded in correspondence with the markers or the QR codes (registered trademark).

[3. About a Process for Deciding the Display Positions of Registration Information Setting Point (POI) Position Identification Marks]

Next, a process for deciding the display positions of registration information setting point (POI) position identification marks will be explained.

As explained above with reference to the sequence diagram of FIG. 5, the information processing apparatus 10 acquires the virtual object display control data from the information provision server 50 on the basis of the access information (URL) provided by the search server. Further, the information processing apparatus 10 uses the virtual object display control data and the camera-shot image to calculate the display positions of the point position identification marks on the display screen.

The process for deciding the display position of the point position identification marks executed by the information processing apparatus 10 will be explained below.

Figure 7:
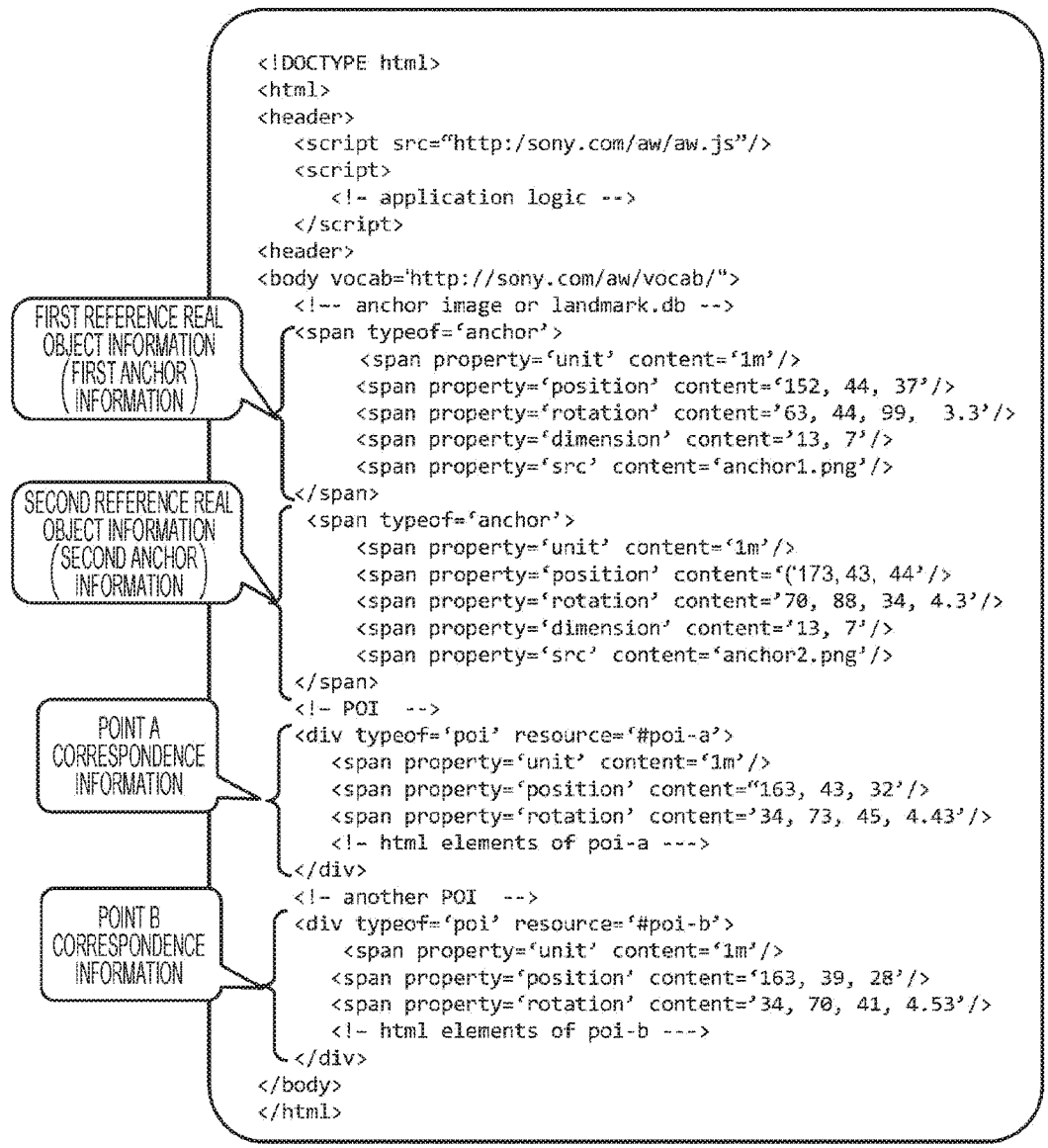
FIG. 7 is a diagram describing an example of HTML data provided by an information provision server.

FIG. 7 is a diagram illustrating part of HTML data included in the data acquired from the information provision server 50 (the virtual object display control data) on the basis of the access information (URL) provided by the search server.

The HTML data described in FIG. 7 includes the data used by the information processing apparatus 10 to execute the process for deciding the display positions of the point position identification marks.

The data described in FIG. 7 is an example of HTML data used to decide the display positions of the following point position identification marks explained above with reference to FIGS. 3(a), 3(b), 4(a), and 4(b):

The point A (POI-A) position identification mark 111
The point B (POI-B) position identification mark 121.

The HTML data described in FIG. 7 records a pre-shot reference image and information on relative positions of real objects included in the reference image and registration information setting points.

As described in FIG. 7, the HTML data of FIG. 7 records the following data:

(1) First reference real object information
(2) Second reference real object information
(3) Point A correspondence information
(4) Point B correspondence information The reference real object information (1) and (2) will be explained with reference to FIGS. 8(a) and 8(b).

A reference real object is a real object that exists in the real world and is located near the registration information setting point. The reference real object constitutes a reference position for calculating the position of the registration information setting point, and is called anchor or anchor object. The shot image of the reference object is called anchor image. The anchor image is used merely as a reference for calculating the position, and may not necessarily be associated with a POI. However, the anchor image may include a POI. To increase the detection accuracy of the reference position, the images of characteristic objects in the real space are desirably used. In addition, the detection accuracy of the position reference can be further enhanced by using a plurality of anchor images taken in various positions and at various angles in the real space. This enables position detection even when the user terminal is moved or rotated.

Examples of reference real objects will be explained with reference to FIGS. 8(a) and 8(b).

FIGS. 8(a) and 8(b) illustrate real objects of a castle and others existing in the real world.

Coordinate axes (XYZ) illustrated in the drawing are coordinate axes in virtual three-dimensional spatial coordinates defining the positional relationship among the real objects in the real world in three-dimensional positions. They are not absolute positional coordinates like GPS but are local coordinates in which the position of an origin point in the virtual three-dimensional spatial coordinates can be arbitrarily set.

As illustrated in FIGS. 8(a) and 8(b), a first reference real object 201 is a real object composed of an area including the upper part of the castle.

In addition, a second reference real object 202 is a real object composed of an area including the entrance to the castle.

These reference real objects are used to determine whether the reference real objects in the real world correspond to positions in the virtual three-dimensional spatial coordinates, and are used by the user terminal to determine the virtual three-dimensional spatial coordinates and decide the display positions of the point position identification marks in the virtual three-dimensional spatial coordinates.

The information on reference real objects is registered in advance in the HTML data provided by the information provision server 50. Specifically, the reference real object information includes the following information:

(1) Reference image=shot image of a reference real object (anchor image) (anchor .png)

(2) Positional information on the reference real object included in the reference image (position: three-dimensional coordinate data (X, Y, Z) indicative of the position of the reference real object in the three-dimensional real space)

(3) Directional information on the reference real object included in the reference image (rotation: information indicative of the posture of the reference real object). The direction can be generally represented by Euler angle. In this example, the direction is represented by quaternion (x, y, z; w) data frequently used in 3D graphics.

(4) Area (dimension) information on the reference image (dimensions: lateral length and vertical length).

(5) Conversion of the reference image between coordinate unit in the virtual three-dimensional space and 3D coordinate unit in the real space (unit: meter or kilometer).

(1) The reference images=the shot images of the reference real objects (anchor.png) are images 201$p$ and 202$p$ illustrated in FIG. 8(b), for example.

(2) The coordinates used in the positional information on the reference real objects included in the reference images (the three-dimensional coordinate data (X, Y, Z) indicative of the positions of the reference real objects in the three-dimensional real space) are coordinates in a world coordinate system, for example. The coordinates indicative of the positions of the reference real objects and the coordinates indicative of the positions of the point correspondence information are in the same coordinate space.

(3) As for the directional information on the reference real objects included in the reference images, the directional information on the reference real objects and the point correspondence information is directional information with respect to the same reference point.

In the HTML data described in FIG. 7, the reference real object information on the first reference real object 201 (first anchor information) includes the following data:

<span type of='anchor'>
<span property='unit' content='1m'/>
<span property='position' content='152,44,37'/>
<span property='rotation' content='63,44,99,3.3'/>
<span property='dimension' content='13,7'/>

```
<span property='src' content='anchor1.png'/>
</span>
```
The meanings of the foregoing data are as follows:
```
<span property='unit' content='1m'/>
```
This data indicates the data unit and the unit of the subsequent figures is one meter:
```
<span property='position' content='152,44,37'/>
```
This is the (2) positional information on the reference real object included in the reference image described above (the three-dimensional coordinate data (X, Y, Z) indicative of the position of the reference real object in the three-dimensional real space).

This data indicates (X, Y, Z)=(152, 44, 37). It is equivalent to the coordinates of the central position of the reference real object, for example.
```
<span property='rotation' content='63,44,99,3.3'/>
```
This is the (3) directional information quaternion (x, y, z: w) on the reference real object included in the reference image described above. This data indicates (x, y, z: w)=(63, 44, 99, 3.3).
```
<span property='dimension' content='13, 7'/>
```
This is the (4) area (dimensions) information of the reference image (lateral length and vertical length) described above.

Specifically, this data indicates that the first reference image is an image corresponding to a real-world area 13 m wide and 7 m long.
```
<span property='src' content='anchor1.png'/>
```
This is the (1) reference image=shot anchor image of the reference real object (anchor1.png).

For example, this is the image 201p illustrated in FIG. 8(b), for example.

The HTML data described in FIG. 7 further records the following data as the reference real object information on the second reference real object 202 (second anchor information):
```
<span type of='anchor'>
<span property='unit' content='1m'/>
<span property='position' content='173,43,44'/>
<span property='rotation' content='70,88,34,4.3'/>
<span property='dimension' content='13,7'/>
<span property='src' content='anchor2.png'/>
</span>
```
The meanings of the foregoing data are similar to those of the reference real object information on the first reference real object 201 (the first anchor information).

Incidentally, in the example of FIG. 7, there are the two units of reference real object information (anchor information). However, this is an example, and an arbitrary number of units of reference real object information (anchor information) can be recorded in the HTML data.

Further, the HTML data described in FIG. 7 also records information on the registration information setting points, that is, the following registration information setting points illustrated in FIGS. 8(a) and 8(b):

(a) Registration information setting point A (POI-A) 211
(b) Registration information setting point B (POI-B) 212.

Specifically, the following point correspondence information is registered:

(1) Registration information associated with the registration information setting points
(2) Positional information on the registration information setting points (three-dimensional coordinate data (X, Y, Z) indicative of the positions of the registration information setting points in the three-dimensional real space)
(3) Directional information on the registration information setting points (information indicating the directions of the registration information setting points from a specific reference point, for example, the camera having shot the reference images)

(1) The registration information associated with the registration information setting points is information such as the point correspondence registration information 112 and 122 explained above with reference to FIGS. 3(a), 3(b), 4(a), and 4(b).

In the HTML data described in FIG. 7, for example, the point correspondence information on the registration information setting point A (POI-A) 211 includes the following data:
```
<div type of='poi' resource='#poi-a'>
<span property='unit' content='1m'/>
<span property='position' content="163,43,32'/>
<span property='rotation' content='34,73,45,4.43'/>
<!—html elements of poi-a - - - >
</div>
```
The meanings of the foregoing data are as follows:
```
<span property='unit' content='1m'/>
```
This data indicates the data unit and the unit of the subsequent figures is one meter:
```
<span property='position' content="163,43,32'/>
```
This is the (2) positional information on the registration information setting points (the three-dimensional coordinate data (X, Y, Z) indicative of the positions of the registration information setting points in the three-dimensional real space).

This data indicates (X, Y, Z)=(163, 43, 32). It is equivalent to the positional coordinates of the registration information setting points in the three dimensional real space.

Incidentally, as described above, the coordinates used here are coordinates in the world coordinate system, for example. The coordinates indicative of the position of the reference real object and the coordinates indicative of the position of the point correspondence information are in the same coordinate space.
```
<span property='rotation' content='34,73,45,4.43'/>
```
This is the (3) directional information quaternion (x, y, z: w) on the registration information setting points described above. This data indicates (x, y, z: w)=(34, 73, 45, 4.43).

Incidentally, as described above, the directional information on the reference real object and the point correspondence information is directional information with respect to the same reference point.
```
<!—html elements of poi-a - - - >
```
This is (1) the registration information associated with the registration information setting point described above, which is information such as the point correspondence registration information 112 and 122 explained above with reference to FIGS. 3(a), 3(b), 4(a), and 4(b).

The HTML data described in FIG. 7 further records the following data as point correspondence information on the registration information setting point B (POI-B) 212:
```
<div type of='poi' resource='#poi-b'>
<span property='unit' content='1m'/>
<span property='position' content="163,39,28'/>
<span property='rotation' content='34,70,41,4.53'/>
<!—html elements of poi-a - - - >
</div>
```
The meanings of the foregoing data are similar to those of the point correspondence information on the registration information setting point A (POI-A) 211 explained above.

Incidentally, in the example of FIG. 7, there are the two units of registration information setting point (POI) correspondence information. However, this is an example, and an arbitrary number of units of registration information setting point (POI) correspondence information can be recorded in the HTML data.

As described above, the HTML data (the virtual object display control data) acquired from the information provision server 50 on the basis of the access information (URL) provided by the search server records the pre-shot reference images, and the positional information on the anchor objects included in the reference images and the registration information setting points in the virtual three-dimensional space.

Specifically, the HTML data includes the following data:

the data of the shot reference images of the reference real objects;

the three-dimensional position and posture information including the positions, directions, and the like of the reference real objects included in the reference image data; and the three-dimensional position and posture information including the positions, directions, and the like of the registration information setting points.

The foregoing information is used by the information processing apparatus 10 to execute the process for deciding the display positions of the point position identification marks.

In the example of FIG. 7, the HTML records the anchor object information and the registration setting point information. Alternatively, the virtual objects and the registration setting point information in the HTML may be recorded in association with each other in JavaScript (registered trademark). Still alternatively, the foregoing information may be acquired as separate data by JavaScript (registered trademark) from the information provision server 50. Therefore, the anchor object information and the registration point information may not be necessarily recorded in the HTML.

The process executed by the data processing unit of the information processing apparatus (user terminal) 10 executes the following process procedure, for example:

The data processing unit of the information processing apparatus (user terminal) 10 inputs from the information provision server 50 the HTML data (the virtual object display control data), that is, the HTML data recording the pre-shot reference images and the positional information on the real objects and the registration information setting points included in the reference images in the virtual 3D spatial coordinates.

Next, the data processing unit detects the same real objects (anchors) in the shot image displayed on the display unit as the real objects included in the reference images. The data processing unit determines the positional information on the user terminal by the use of the three-dimensional positional information on the detected real objects (anchors) and the relative position information recorded in the virtual object display control data. Incidentally, the data processing unit performs a three-dimensional position and posture information analysis process to determine the position of the user terminal from the shot image and the reference images. This process will be described later. Further, the data processing unit calculates the three-dimensional positions of the registration information setting points in the coordinate system with the user terminal as an origin point.

The data processing unit calculates the display positions of the registration information setting points in the shot image displayed on the display unit on the basis of the calculated positional information, and superimposes and displays the point position identification marks as virtual objects in the calculated display positions. For superimposition and display of the virtual objects, the CSS three-dimensional TRANSFORMS function can be used for three-dimensional display.

According to the foregoing procedure, the data processing unit displays the point position identification marks in accordance with the registration information setting points in the shot image.

Incidentally, the process procedure is recorded in JavaScript (registered trademark) acquired by the information processing apparatus 10 from the information provision server 50.

Next, a configuration example of JavaScript (registered trademark) data as one component of the virtual object display control data acquired by the information processing apparatus 10 together with the HTML data described in FIG. 7 from the information provision server 50 will be explained with reference to FIG. 9. JavaScript (registered trademark) is used as a display control program for virtual objects.

Figure 9:
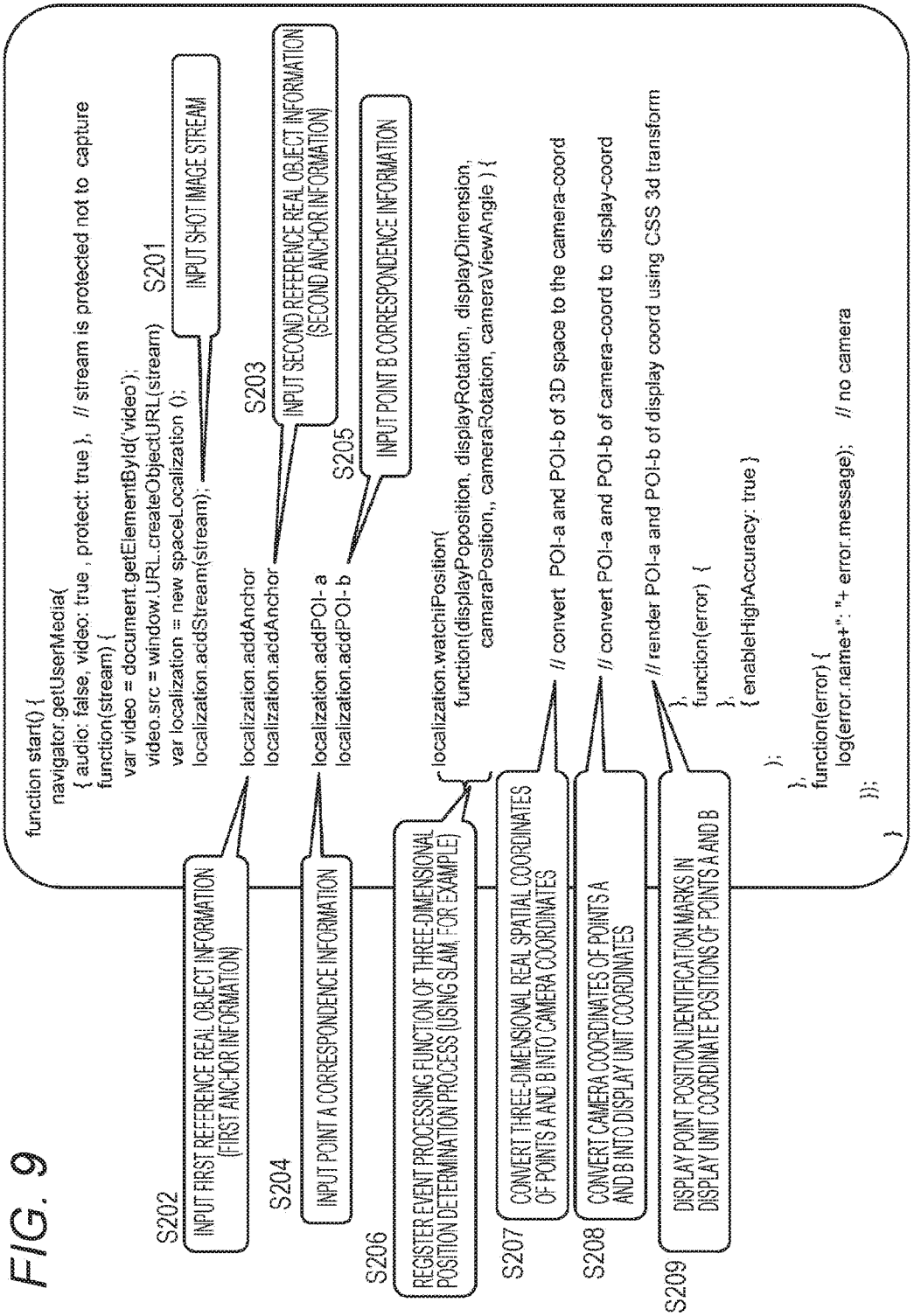
FIG. 9 is a diagram describing an example of a display control program (JavaScript (registered trademark)) provided by the information provision server.

FIG. 9 describes part of JavaScript (registered trademark) data acquired from the information provision server 50 on the basis of the access information (URL) provided by the search server.

JavaScript (registered trademark) described in FIG. 9 is equivalent to a processing program recording a process procedure for the information processing apparatus 10 to decide the display positions of the point position identification marks.

The process executed by the data processing unit of the information processing apparatus 10 on the basis of JavaScript (registered trademark) described in FIG. 9 will be explained in sequence according to the process steps (S201 to S209) described in FIG. 9.

(Step S201)

First, the data processing unit of the information processing apparatus 10 inputs a shot image input stream taken by the camera of the information processing apparatus.

The shot image is image data currently input via the camera. The shot image is continuously displayed on the display unit. Incidentally, the shot image explained here means the image shot by the camera function, and may or may not be recorded in the storage unit.

(Step S202)

Next, at step S202, the data processing unit of the information processing apparatus 10 inputs first reference real object information (first anchor information).

The first reference real object information (first anchor information) is the first reference real object information (first anchor information) recorded in the HTML data as explained above with reference to FIG. 7.

That is, the first reference real object information includes the following information on the first reference real object (first anchor):

(1) Reference image=shot image of the reference real object (anchor1.png)

(2) Positional information on the reference real object included in the reference image (three-dimensional coordinate data (X, Y, Z) indicative of the position of the reference real object in the three-dimensional real space)

(3) Quaternion (x, y, z: w) indicative of directional information on the reference real object included in the reference image (4) Area (dimensions) information on the reference image (lateral length and vertical length).

The data processing unit of the information processing apparatus 10 reads the foregoing first reference real object information (first anchor information) from the HTML data.

(Step S203)

Next, at step S203, the data processing unit of the information processing apparatus 10 inputs second reference real object information (second anchor information).

The second reference real object information (second anchor information) is the second reference real object information (second anchor information) recorded in the HTML data as explained above with reference to FIG. 7.

Incidentally, in the example of FIG. 9, the two units of reference real object information (anchor information) are read. However, this is a mere example, and in actuality, all the units of the reference real object information (anchor information) recorded in the HTML data are read.

(Step S204)

Next, at step S204, the data processing unit of the information processing apparatus 10 inputs the registration information setting point A (POI-A) correspondence information.

The registration information setting point A (POI-A) correspondence information is the point A correspondence information recorded in the HTML data as explained above with reference to FIG. 7.

That is, the registration information setting point A (POI-A) correspondence information includes the following information on the registration information setting point A:

(1) Registration information associated with the registration information setting point (2) Positional information on the registration information setting point (three-dimensional coordinate data (X, Y, Z) indicative of the position of the registration information setting point in the three-dimensional real space)

(3) Quaternion (x, y, z: w) indicative of directional information on the registration information setting point The data processing unit of the information processing apparatus 10 reads the foregoing point A (POI-A) correspondence information from the HTML data.

(Step S205)

Next, at step S205, the data processing unit of the information processing apparatus 10 inputs registration information setting point B (POI-B) correspondence information.

The registration information setting point B (POI-B) correspondence information is the point B correspondence information recorded in the HTML data as explained above with reference to FIG. 7.

Incidentally, in the example of FIG. 9, the two units of registration information setting point (POI) correspondence information are read. However, this is a mere example, and in actuality, all the units of the registration information setting point (POI) correspondence information recorded in the HTML data are read.

(Step S206)

Next, at step S206, the data processing unit of the information processing apparatus 10 registers the result of the calculation by the process for determining the position of the camera in the user terminal from the reference images (three-dimensional position analysis process) as the function of JavaScript (registered trademark) (event processing function).

The positioning process before step S206 is performed by the use of the following information acquired at steps S202 to S205:

(1) The reference image data obtained by shooting the reference real objects and the three-dimensional position and posture information including the positions, directions, and the like of the reference real objects included in the reference image data (2) The three-dimensional position and posture information including the positions, directions, and the like of the registration information setting points (3) The shot image input at step S201.

Incidentally, the positioning process (three-dimensional position and posture information analysis process) is performed as a process with the use of simultaneous localization and mapping (SLAM), for example. SLAM is a process for selecting feature points from various real objects included in the camera-shot image and detecting the positions of the selected feature points and the position and posture of the camera. In addition, SLAM is described in Japanese Patent No. 5380789 filed as a prior application by the applicant of the present application.

To perform the process with SLAM, the data processing unit of the information processing apparatus 10 inputs necessary parameters such as the positions, the directions (rotations), and the areas (dimensions) of the display unit (display) and the camera of the information processing apparatus.

The outline of the three-dimensional position and posture analysis process with SLAM is as follows:

First, real objects coinciding with reference real objects are detected from the camera-shot image. This is executed by feature point comparison (feature point matching) of the reference image data on the shot reference real objects acquired from the HTML data and the shot image.

Next, the three-dimensional positions and postures of the shot objects detected from the camera-shot image are analyzed on the basis of differences between the objects included in the reference images and the objects included in the camera-shot image.

The position of the camera having shot the reference images and the current image shooting position (the camera position of the information processing apparatus (user terminal)) do not match, and the objects included in the reference images and the objects included in the camera-shot image are different in direction and size.

These differences are analyzed, and the three-dimensional position and posture of the camera in the real space are analyzed with reference to the shot objects corresponding to the reference objects detected from the camera-shot image.

Incidentally, these analyses are performed by the use of camera setting information such as the lens magnification, the positional and directional information, and angle information of the camera in the information processing apparatus.

Next, the information on the positions, directions, sizes, and the like of the reference real objects recorded in the HTML data, the three-dimensional position and posture information on the camera in the real space, and the position and direction of the registration information setting points (POI) included in the shot image in the virtual three-dimensional space are calculated.

Incidentally, the position of the camera calculated by the foregoing process is represented by the coordinates (Xw, Yw, Zw) of the three-dimensional position camaraPosition in the world coordinate system, for example. In addition, camaraRotation indicative of the direction of the camera and CameraViewAngle indicative of the view angle of the camera are represented by quaternions.

(Step S207)

Next, at step S207, the data processing unit of the information processing apparatus 10 converts the three-dimensional position coordinates of the registration information setting point A (POI-A) and the registration information setting point B (POI-B) into camera coordinates.

The camera coordinates constitute a coordinate system in which XYZ coordinate axes are set for the camera's viewpoint (imaging unit) with cameraPosition and cameraRotation at an origin point in accordance with the direction of the camera.

At step S207, the coordinates (Xw, Yw, Zw) of the registration information setting point A (POI-A) and the registration information setting point B (POI-B) recorded in the HTML data in the world coordinate system are converted into coordinates (Xc, Yc, Zc) in the camera coordinate system from the position and direction of the camera in the world coordinate system obtained by three-dimensional positioning at S206.

(Step S208)

Next, at step S208, the data processing unit of the information processing apparatus 10 converts the camera coordinates of the registration information setting point A (POI-A) and the registration information setting point B (POI-B) into display unit (display) coordinates.

The display unit coordinates constitute a coordinate system in which X axis is set in a rightward direction and Y axis is set in a leftward direction with the upper left corner of the display unit at an origin point, for example. At this step, the registration setting points outside the field of view of the camera are not used in the subsequent display process.

At step S208, the data processing unit converts the coordinates (Xc, Yc, Zc) of the registration information setting point A (POI-A) and the registration information setting point B (POI-B) in the camera coordinate system calculated at step S207 into display unit coordinates (Xd, Yd).

Incidentally, to execute three-dimensional image display, the display unit coordinates are calculated for a left-eye display unit and a right-eye display unit. That is, they are the display unit coordinates (Xdl, Ydl) for the left-eye display unit and the display coordinates (Xdr, Ydr) for the right-eye display unit.

Incidentally, at this step, it is necessary to set a left-eye image and a right-eye image with parallax in accordance with the value of the Z axis (distance) in the camera coordinate system, and a difference according to the parallax between the horizontal coordinates, for example, the coordinate values of Xdl and Xdr is set.

Incidentally, these processes are executed in accordance with a conventional algorithm for three-dimensional image generation process.

(Step S209)

Next, at step S209, the data processing unit of the information processing apparatus 10 displays the point A (POI-A) position identification mark in the display unit (display) coordinate position of the registration information setting point A (POI-A), and displays the point B (POI-B) position identification mark in the display unit (display) coordinate position of the registration information setting point B (POI-B).

These point (POI) position identification marks are the point (POI) position identification marks displayed in the display image explained above with reference to FIGS. 3(a), 3(b), 4(a), and 4(b).

As described above, the information processing apparatus 10 determines the position and direction of the camera by the three-dimensional positioning process with the use of the HTML data and the JavaScript (registered trademark) data acquired from the information provision server 50 on the basis of the access information (URL) provided by the search server, and calculates the display unit (display) coordinate positions of the registration information setting points (POI) included in the shot image on the basis of the determination result, and displays the point (POI) position identification marks in the coordinate positions.

Further, the registration information on the registration information setting points with the point (POI) position identification marks is displayed near the display positions of the point (POI) position identification marks.

The display positions of the registration information, and the display modes of the registration information and the point (POI) position identification marks, for example, colors, characters, angles, and others can be set in accordance with the CSS regulations as a style sheet received together with HTML data and JavaScript (registered trademark) data from the information provision server 50.

[4. About the Sequence of Processes Executed by the Information Processing Apparatus]

Next, the sequence of processes executed by the information processing apparatus (user terminal) 10 will be explained with reference to the flowchart described in FIG. 10.

The following processes executed by the information processing apparatus 10 will be explained in sequence.

Figure 10:
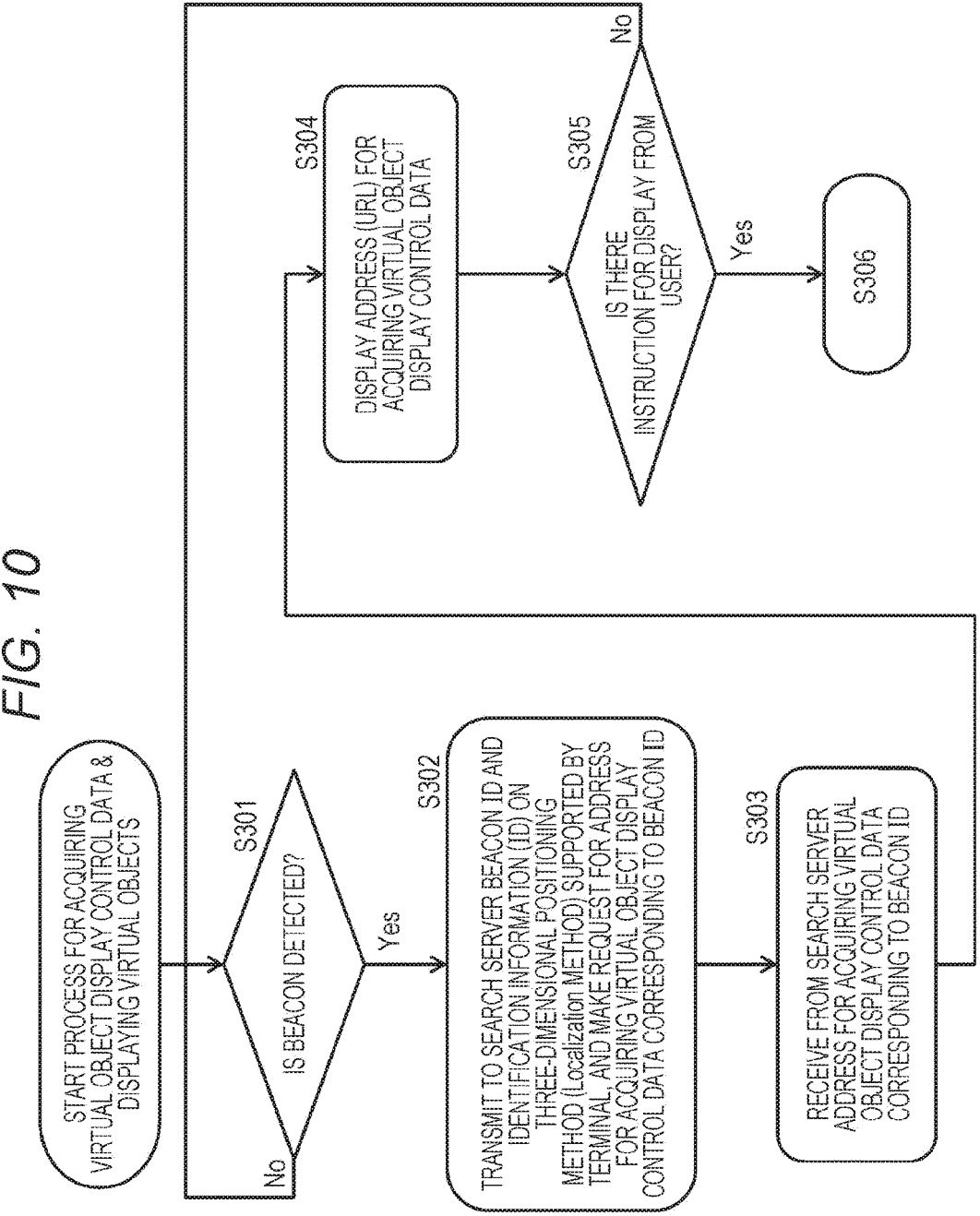
FIG. 10 is a flowchart of a sequence of a process for acquiring virtual object display control data and displaying virtual objects.
Figure 11:
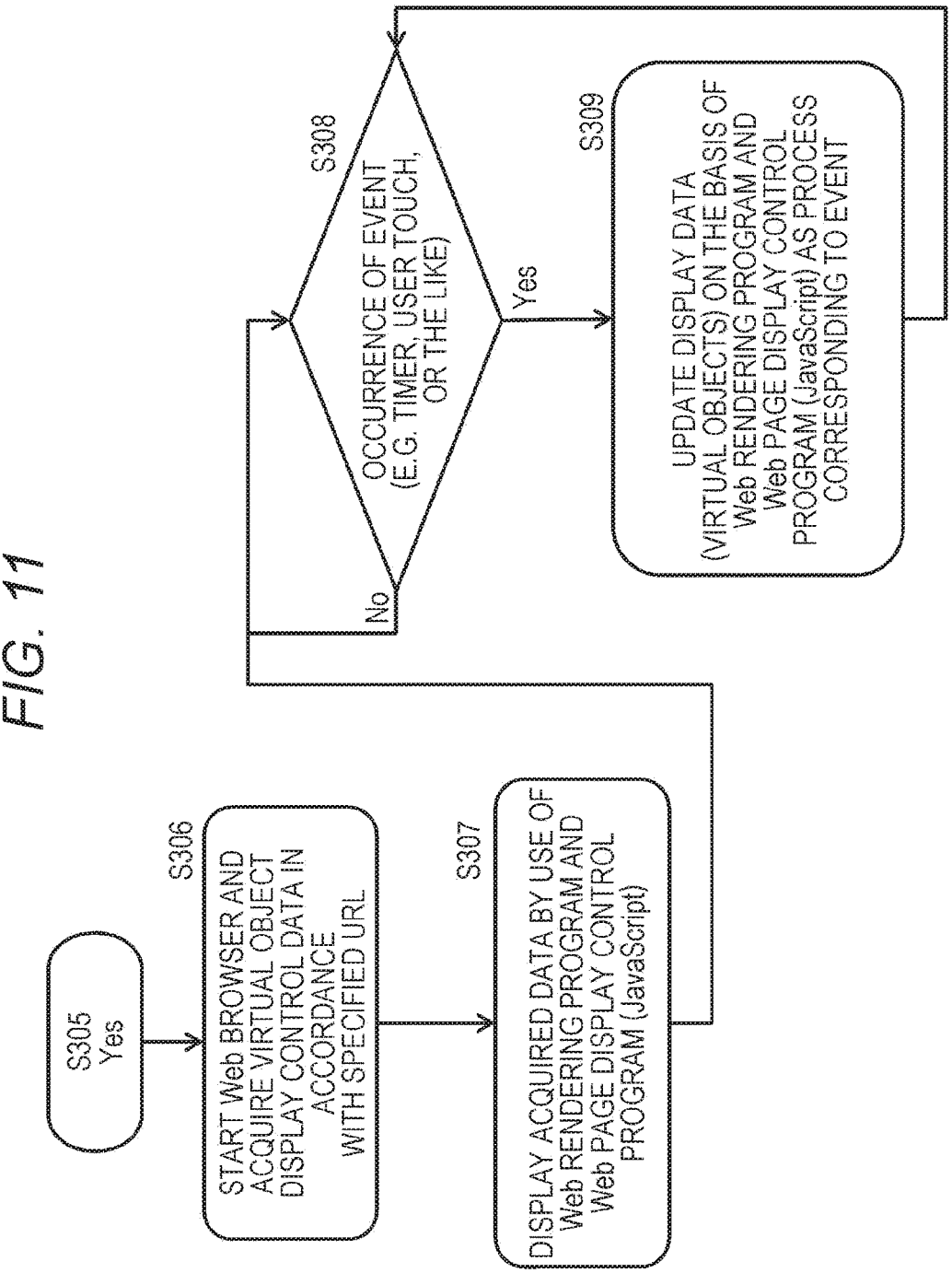
FIG. 11 is a flowchart of the sequence of the process for acquiring virtual object display control data and displaying virtual objects.

(1) Process for acquiring the virtual object display control data and displaying the virtual objects, and a process for events such as the user's touch (FIGS. 10 to 11)

Figure 12:
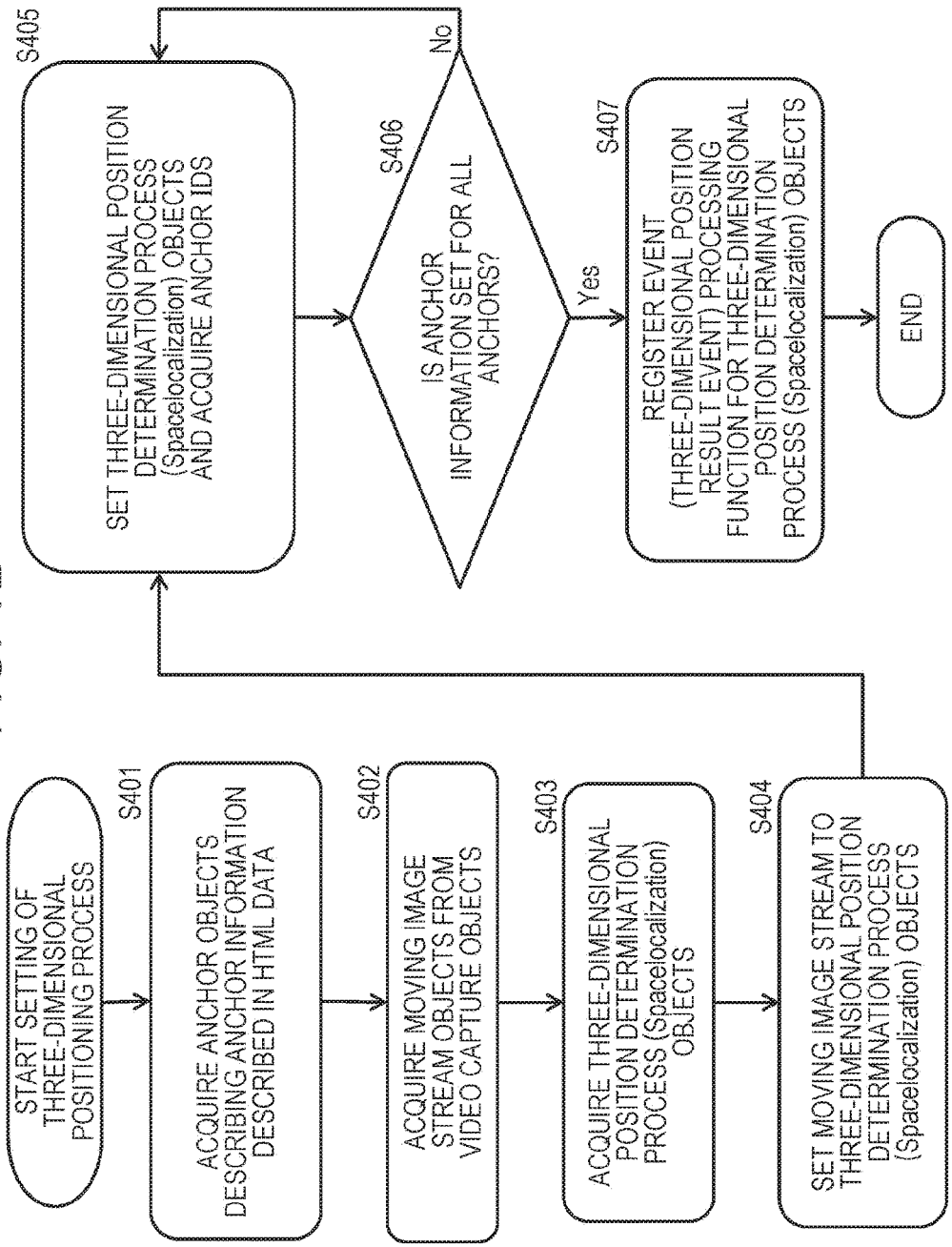
FIG. 12 is a flowchart of a sequence of a process for setting positioning process objects.

(2) Setting for three-dimensional positioning process (FIG. 12)

Figure 13:
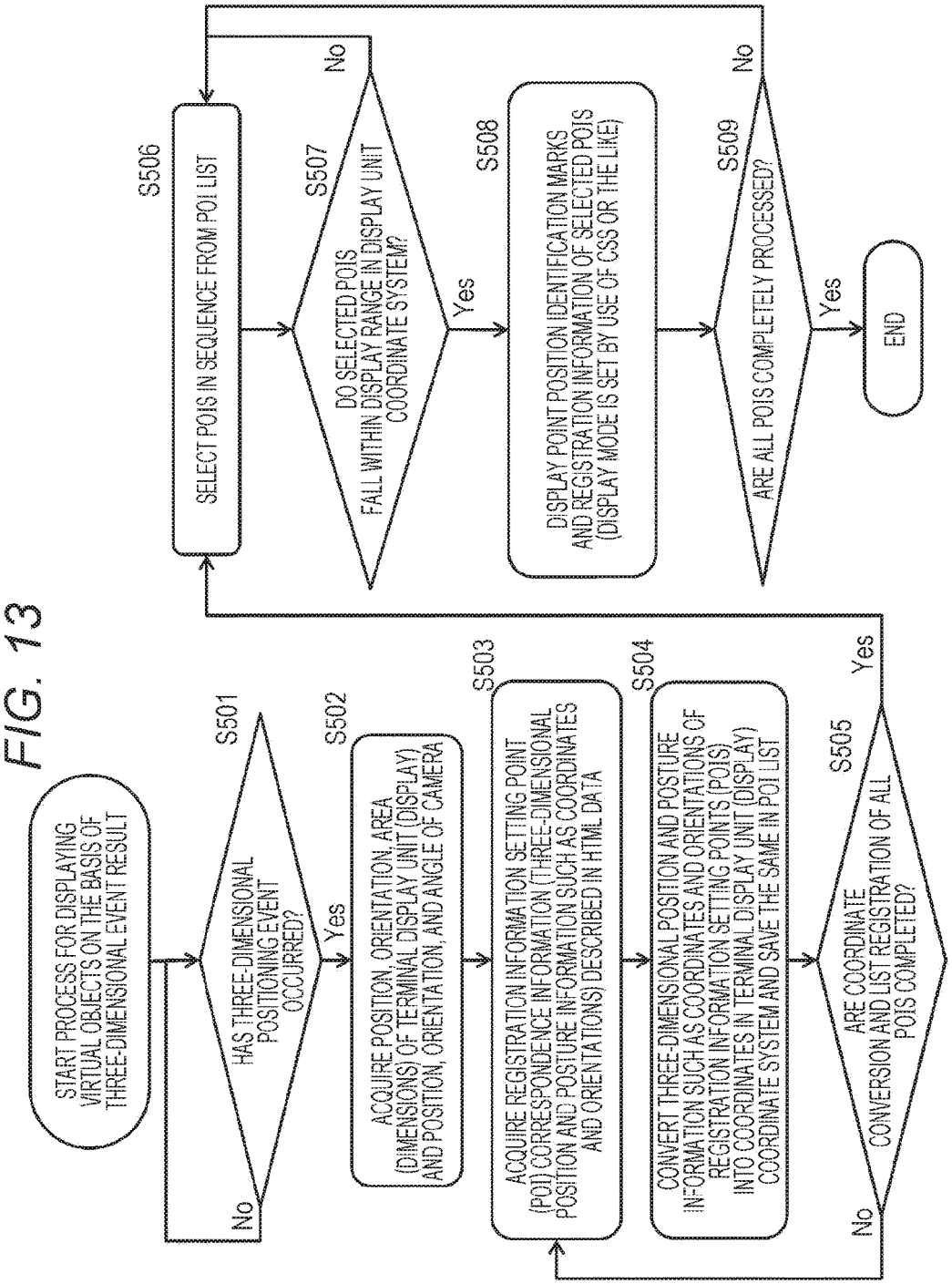
FIG. 13 is a flowchart of a sequence of a process for displaying virtual objects based on the detection of a virtual object display event.

(3) Process for displaying the virtual objects based on the detection of an event as a result of the three-dimensional positioning (FIG. 13)

Figure 14:
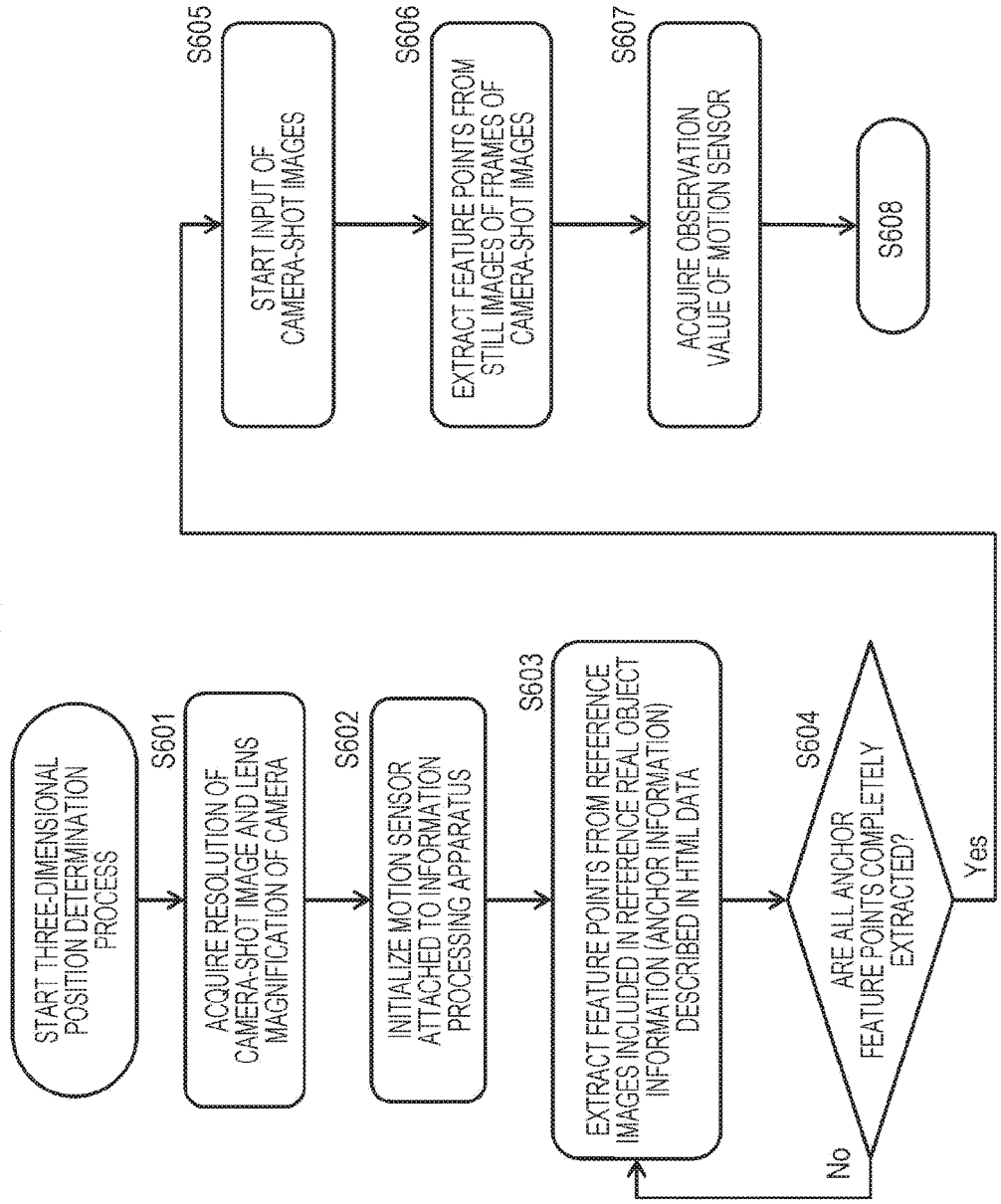
FIG. 14 is a flowchart of a sequence of a process for detecting a virtual object display update event and making a notification.
Figure 15:
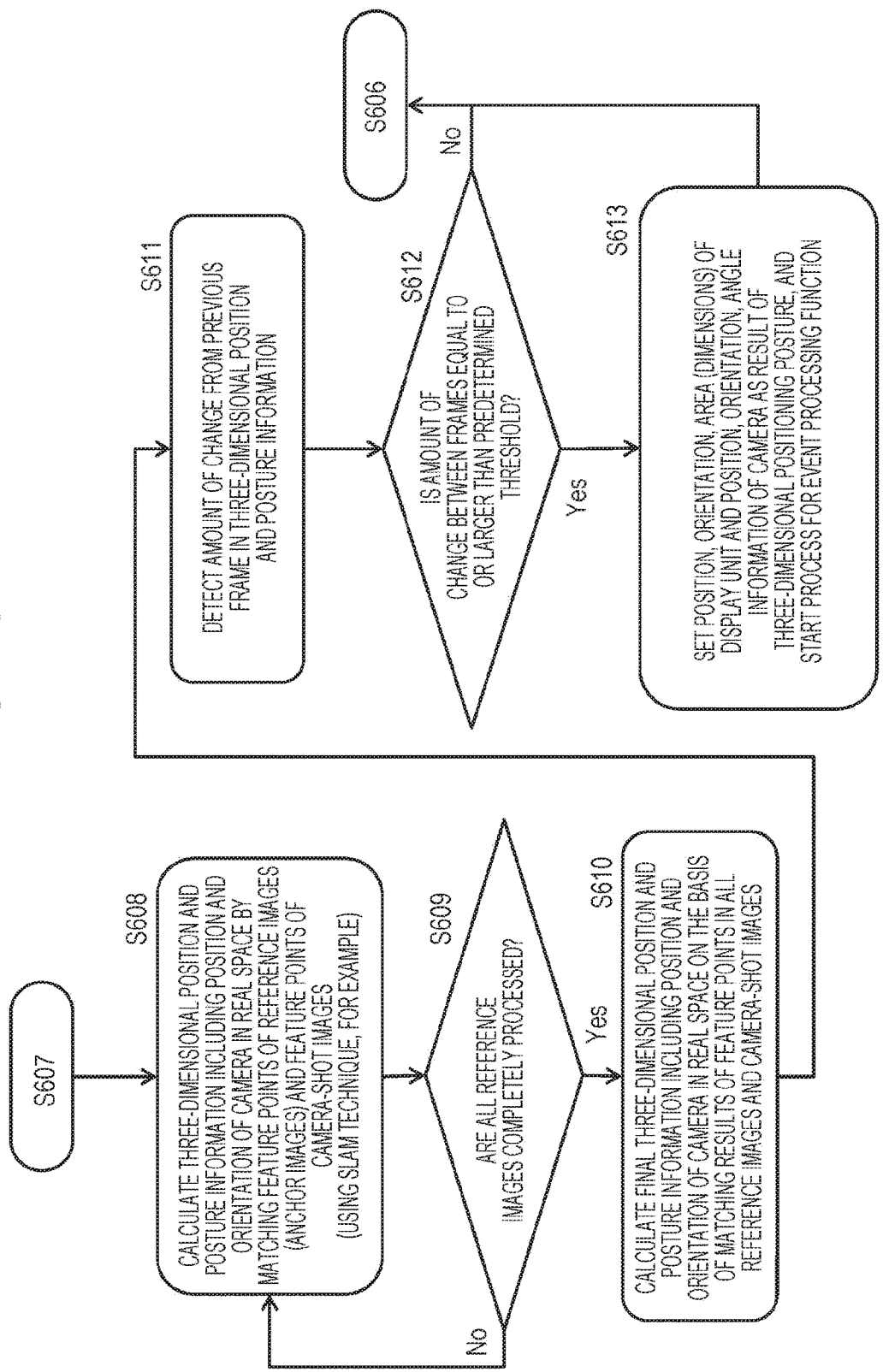
FIG. 15 is a flowchart of the sequence of the process for detecting a virtual object display update event and making a notification.

(4) Process for three-dimensional positioning and a process for notifying the event as a positioning result (FIGS. 14 to 15).

Incidentally, the foregoing processes are all executed by the data processing unit of the information processing apparatus 10. The data processing unit includes the CPU having the program execution function to perform these processes in accordance with the programs stored in the storage unit of the information processing apparatus 10.

Besides, some of the programs stored in the storage unit of the information processing apparatus 10 includes programs received from the information provision server 50, for example, JavaScript (registered trademark).

[4-1. Process for Acquiring Virtual Object Display Control Data and Displaying Virtual Objects]

First, referring to the flowchart described in FIGS. 10 to 11, the sequence of processes for acquiring the virtual object display control data and displaying the virtual objects will be explained.

The steps of the process flow described in FIGS. 10 and 11 will be explained below in sequence.

(Step S301)

First, at step S301, the information processing apparatus performs beacon detection to determine whether a beacon from the beacon transmitter has been received.

When the beacon is detected, the process moves to step S302.

(Step S302)

When the beacon is detected, at step S302, the information processing apparatus requests the search server for the address (URL) for acquiring the virtual object display control data associated with the beacon transmitter.

When making the request, the information processing apparatus transmits to the search server the beacon ID included in the beacon and the identification information (ID) of the three-dimensional positioning method (localization method) supported by the terminal.

(Step S303)

Next, at step S303, the information processing apparatus receives from the search server the address (URL) for acquiring the virtual object display control data associated with the beacon transmitter.

(Step S304)

Next, at step S304, the information processing apparatus displays on the display unit the address (URL) for acquiring the virtual object display control data associated with the beacon transmitter received from the search server. The search server may transmit attribute information such as the title indicative of the display control data as well as the URL, and the information processing apparatus may display on the display unit information easy for the user to understand instead of the URL.

(Step S305)

Next, at step S305, the information processing apparatus determines whether the user has given a display instruction for the address (URL) for acquiring the virtual object display control data and the attribute information such as the title displayed on the display unit.

When the user's display instruction is detected, the process moves to step S306. When it is not detected, the process returns to step S301.

(Step S306)

Next, at step S306, the information processing apparatus activates the web browser and acquires the virtual object display control data accessed by the user in accordance with the specified URL from the information provision server.

Incidentally, as described above, the virtual object display control data acquired from the information provision server is specifically composed of the following data and the like:

(1) Hyper Text Markup Language (HTML)
(2) Cascading Style Sheet (CSS)
(3) JavaScript (registered trademark).

The HTML is data indicative of a basic structure of virtual objects to be displayed on the display unit of the information processing apparatus, and is HTML 5, for example.

The CSS is a style sheet that defines the display formats, colors, shapes, and others of the virtual object configuration data defined by the HTML, which is data defining the style of the virtual objects displayed on the display unit of the information processing apparatus.

The JavaScript (registered trademark) is a display control program that defines the process for displaying the virtual objects, the process for updating the display, or the process for moving and updating the virtual objects. For example, it controls various actions such as changing the display mode of the virtual objects, with various events such as touch and click on a display object by the user or events such as a lapse of a predetermined period of time as triggers.

The virtual object display control data is data acquired by one URL. It can be acquired by the access information (URL) selected by the search server on the basis of the beacon transmitter identifier (ID) included in the beacon from the beacon transmitter.

Specifically, the virtual object display control data having components such as HTML, CSS, and JavaScript (registered trademark) includes positional information and guide information on various facilities near the one specific beacon transmitter. It is data for displaying the virtual objects such as the point (POI) position identification marks and the point correspondence registration information explained above with reference to FIGS. 3(a), 3(b), 4(a), and 4(b) and performing display controls.

(Step S307)

Next, at step S307, the information processing apparatus decides the display positions and the display modes of the virtual objects, and displays the virtual objects on the display unit by the use of the virtual object display control data acquired from the information provision server. Incidentally, this process is performed by the use of a web rendering program and a web page display control program (JavaScript (registered trademark)), for example.

Incidentally, the virtual objects displayed on the display unit are the registration information setting points (POI) position identification marks and the registration information associated with the registration information setting points (POI) explained above with reference to FIGS. 3(a), 3(b), 4(a), and 4(b), for example.

Basic information on these virtual objects is recorded in the HTML data included in the virtual object display control data acquired from the information provision server. The display mode of these virtual objects can be set in accordance with the CSS included in the virtual object display control data similarly acquired from the information provision server.

(Step S308)

Next, at step S308, the information processing apparatus determines the presence or absence of detection of an event as a trigger for updating the display of the virtual objects on the display unit.

The events as triggers for updating the display of the virtual objects include various kinds of events such as the user's touch on the display unit, a lapse of a predetermined time from start of display of the virtual objects, and the movement of the display screen, for example.

What event to be detected to execute display updating is described in the JavaScript (registered trademark) provided by the information provision server, and the display updating is executed in accordance with the description.

Besides, the event detection may be performed in accordance with not only the JavaScript (registered trademark) provided by the information provision server but also the display control program held by the information processing apparatus so that the display updating can be executed in accordance with the detected event.

When any event as a trigger for updating the display of the virtual objects on the display unit is detected at step S308, the process moves to step S309.

(Step S309)

Next, at step S309, the information processing apparatus executes the updating of the display data (virtual objects) as an event process on the basis of the web rendering program and the web page display control program (JavaScript (registered trademark) and the like).

[4-2. Process for Setting Positioning Process Anchor Information]

Next, the sequence of the process for setting positioning process anchor information will be explained with reference to the flowchart described in FIG. 12. The flowchart of FIG. 12 describes a process according to the JavaScript (registered trademark) program which is executed at steps S201 to S206 of the JavaScript (registered trademark) program described in FIG. 9, for example. The objects described in FIG. 12 refer to the objects processed by JavaScript (registered trademark).

The steps of the flowchart described in FIG. 12 will be explained below in sequence.

(Step S401)

First, at step S401, the information processing apparatus acquires anchor objects including the reference images described in the HTML data received from the information provision server. The HTML data can be acquired as document object model (DOM) objects from the JavaScript (registered trademark) program.

As explained above with reference to FIG. 7, the anchor information objects described in the HTML data include the following data:

(1) Reference image=reference images as anchors (anchor1.png)

(2) Positional information on the anchors included in the reference images (three-dimensional coordinate data (X, Y, Z) indicative of the positions of the anchors in the virtual three-dimensional real space)

(3) Directional information on the anchors included in the reference images (quaternions (x, y, z: w) indicative of the directions in the virtual three-dimensional real space)

(4) Area (dimensions) information on the reference images (lateral lengths and vertical lengths).

(Step S402)

Next, at step S402, the information processing apparatus acquires moving image stream objects from video capture objects taken by the use of the camera function of the information processing apparatus.

(Step S403)

Next, at step S403, the information processing apparatus acquires three-dimensional position determination process (Spacelocalization) objects.

(Step S404)

Next, at step S404, the information processing apparatus sets the moving stream objects acquired at step S402 to three-dimensional position calculation process (Spacelocalization) objects. By steps S402 to S404, the information processing apparatus can process the moving image stream shot by the camera in the three-dimensional position determination process.

(Step S405)

Next, at step S405, the information processing apparatus sets the anchor objects acquired at step S401 to the three-dimensional position determination process (Spacelocalization) shot objects set at step S404, and registers (stores in the storage unit) the same with anchor IDs. Accordingly, the anchor information described in the HTML data is input into the three-dimensional position calculation process.

(Step S406)

Next, at step S406, the information processing apparatus determines whether the process for associating all the anchors with the spatial position determination process objects is completed.

When the process is not completed, the process returns to step S405 to set the anchor objects to the unprocessed data.

When it is determined that the process for associating the anchor objects with the spatial position calculation process objects is completed, the process moves to step S407.

(Step S407)

Next, at step S407, the information processing apparatus registers an event (three-dimensional position result event) processing function for the three-dimensional position determination process (Spacelocalization) objects.

Incidentally, the event processing function is an event that is a trigger for process start as a result of calculation of the position and direction of the camera in the virtual three-dimensional space from the reference images included in the anchor information and the moving image stream shot by the camera in three-dimensional position determination.

Specifically, this is an event processing function that is generated when the image shot by the imaging unit of the information processing apparatus is moved by a predetermined amount (preset defined value) or more due to the movement of the user, the movement of the shooting direction of the camera, or the like, and changes in the position and direction of the camera in the virtual three-dimensional space are detected. When the event processing function is registered at step S407, the process for calculating the three-dimensional position of the camera is started by the use of the three-dimensional position calculation process (Spacelocalization) objects.

Incidentally, the accuracy of event generation according to a predetermined amount of movement, that is, the frequency of the event is recorded in the JavaScript (registered trademark) received from the information provision server. This is set at the time of registration of the event processing function and is input into the three-dimensional position determination processing unit.

[4-3. Process for Displaying Virtual Objects Based on the Detection of a Virtual Object Display Event]

Next, the sequence of a virtual object display process based on the detection of a virtual object display event will be explained with reference to the flowchart described in FIG. 13. The flowchart describes a process according to the JavaScript (registered trademark) program which is executed in the three-dimensional positioning process event function at steps S207 to S209 of the JavaScript (registered trademark) program described in FIG. 9.

The steps of the flowchart described in FIG. 13 will be explained in sequence.

(Step S501)

First, at step S501, the information processing apparatus determines whether an event for the three-dimensional position determination process (Spacelocalization) objects has occurred. This determination corresponds to the determination on whether the event processing function registered at step S407 described in FIG. 12 has been invoked.

When it is determined at step S501 that an event for the three-dimensional position calculation process has occurred, the process moves to step S502.

(Step S502)

When it is determined at step S501 that the event for displaying or updating the virtual objects has occurred, the information processing apparatus acquires at step S502 the position, direction and area (dimensions) of the terminal display unit (display), and the position, direction, and angle of the camera. This step means that the foregoing information is passed as arguments of the event processing function registered as described in FIG. 12.

(Step S503)

Next, at step S503, the information processing apparatus acquires the registration information setting point (POI) correspondence information (three-dimensional position and posture information on coordinates, directions, and the like) described in the HTML data. As described at step S401 in FIG. 12, the registration information setting point (POI) information recorded in the HTML data can be acquired as DOM objects by the JavaScript (registered trademark) program as in the case of the acquisition of the anchor information recorded in the HTML data.

(Step S504)

Next, at step S504, the information processing apparatus converts the three-dimensional position and posture information on the coordinates, directions, and the like of the registration information setting points (POI) acquired from the HTML data received at step S503 from the information provision server into coordinates in the terminal display unit (display) coordinate system, and saves the same in a POI list.

In the conversion process, there are two stages at which the POI coordinates of the positions and postures of the registration information setting points (POI) are converted into the user terminal coordinate system with the user terminal (camera) at an origin point, and then the converted POI coordinates in the terminal coordinate system are further converted into the display device coordinate system.

To convert from the user terminal coordinate system into the display device coordinate system, the position and direction of the camera and the position and direction of the terminal display unit (display) in the virtual three-dimensional space are required. Accordingly, the information acquired at step S502 is used. In particular, in the case of the user terminal in which the direction of the display does not coincide with the direction of the camera, it is necessary to calculate the display positions of the POIs in the display coordinate system with consideration given to the difference in the directions.

(Step S505)

Next, at step S505, the information processing apparatus determines whether the coordinate conversion and the list registration are completed for all the POIs.

When they are not completed, the process returns to step S503 to execute process at steps S503 and S504 on the unprocessed POIs.

When it is determined that coordinate conversion and the list registration are completed for all the POIs, the process moves to step S506.

(Step S506)

When it is determined that the coordinate conversion and the list registration are completed for all the POIs, the information processing apparatus selects POIs in sequence from the generated POI list at step S506.

(Step S507)

Next, at step S507, the information processing apparatus determines whether the coordinates of the POI selected from the list (the coordinates in the display unit coordinate system) fall within the display range of the display unit. Whether they fall within the display range is determined from information on the position and direction of the camera and the position and direction of the terminal display unit (display) in the virtual three-dimensional space. In particular, when the information processing apparatus displays the video from the shooting unit on part of the display unit, the display position of the POI can be calculated in accordance with the display positions of the shot video and the POI can be superimposed in the position of the real object seen in the shot video.

When the coordinates of the POI do not fall within the display range of the display unit, the processing of the POI is stopped and the process returns to step S506 to select the next POI from the POI list.

When it is determined at step S507 that the coordinates of the POI selected from the list (the coordinates in the display unit coordinate system) fall within the display range of the display unit, the process moves to step S508.

(Step S508)

When it is determined that the coordinates of the POI selected from the list (the coordinates in the display unit coordinate system) fall within the display range of the display unit, the information processing apparatus displays the point position identification mark and the registration information of the selected POI at step S508. Incidentally, the display mode of these virtual objects is set by the use of CSS or the like, for example.

(Step S509)

Next, at step S509, the information processing apparatus determines whether all of the POIs are completely processed.

When there is any unprocessed POI, the process returns to step S506 to select the next unprocessed POI from the POI list and execute step S507 and subsequent steps.

When it is determined at step S509 that all of the POIs are completely processed, the process is terminated.

[4-4. Process for Three-Dimensional Position Determination]

Next, the sequence of a camera three-dimensional position determination process will be explained with reference to the flowcharts of FIGS. 14 to 15. The process in these flowcharts is executed not by JavaScript (registered trademark) in the display control data provided by the information provision server 50 but by the program recorded in the recording unit of the information processing apparatus, for example. This makes it possible to avoid the problem that an algorithm for three-dimensional position determination is disclosed by the JavaScript (registered trademark) program, and perform three-dimensional position determination by high-speed processing or the like of hardware in the information processing apparatus at high speed, high accuracy, and low power consumption.

The steps of the flowcharts described in FIGS. 14 to 15 will be explained below in sequence.

(Step S601)

First, at step S601, the data processing unit of the information processing apparatus acquires the resolution of the camera-shot image and the lens magnification of the camera. This step is executed by acquiring the camera setting information recorded in the memory of the camera control unit of the information processing apparatus.

(Step S602)

Next, at step S602, the information processing apparatus initializes a motion sensor attached to the information processing apparatus. Specifically, the information processing apparatus resets the data measured in the past and performs an initialization process to set the current position and inclination (direction) to initial values. The motion sensor is a gyro or an acceleration sensor used to determine the position and posture of the information processing apparatus.

(Step S603)

Next, at step S603, the information processing apparatus extracts feature points from the reference real object information (anchor information) described in the HTML data (see FIG. 7) acquired from the information provision server, that is, the reference images included in the (anchor information) set in the three-dimensional position determination process at step S405 described in FIG. 12.

(Step S604)

Next, at step S604, the information processing apparatus determines whether the process for extracting feature points from the reference images corresponding to all the reference real object information (anchor information) set in the three-dimensional position determination process at step S405 described FIG. 12 is completed.

When there is any unprocessed reference image, the process returns to step S603 to extract feature points from the unprocessed reference image.

When it is determined that the process for extracting feature points from the reference images corresponding to all the reference real object information (anchor information) described in the HTML data (see FIG. 7) acquired from the information provision server is completed, the process moves to step S605.

(Step S605)

When the process for extracting feature points from the reference images corresponding to all the reference real object information (anchor information) described in the HTML data (see FIG. 7) acquired from the information provision server is completed, the data processing unit of the information processing apparatus starts input of the camera-shot image at step S605.
(Step S606)
Next, at step S606, the data processing unit of the information processing apparatus extracts feature points from the frames of the camera-shot image.
(Step S607)
Next, at step S607, the data processing unit of the information processing apparatus acquires observation values of the motion sensor.
(Step S608)
Next, at step S608, the data processing unit of the information processing apparatus calculates three-dimensional position and posture information including the position and direction of the camera in the real space by matching the feature points of the reference images (anchor images) and the feature points of the camera-shot image. This process is executed by the use of the SLAM technique described above, for example.
(Step S609)
Next, at step S609, the information processing apparatus determines whether the three-dimensional position and posture information calculation process by matching the feature points of all the reference images (anchor images) and the feature points of the camera-shot image is completed.

When there is any unprocessed reference image, the process returns to step S608 to process the unprocessed reference image.

When it is determined that all the reference images are completely processed, the process moves to step S610.
(Step S610)
Next, at step S610, the information processing apparatus calculates final three-dimensional position and posture information on the position and direction of the camera in the real space on the basis of the result of matching feature points in all the reference images and the camera-shot image.

At step S608, the camera three-dimensional position and posture information corresponding to one each reference image (anchor image) is calculated, and different camera three-dimensional position and posture information is calculated for the plurality of reference images.

At step S610, for example, the plurality of values is subjected to averaging or the like to calculate the three-dimensional position and posture information including the final position and direction of the camera in the real space. By determining the three-dimensional position and posture with the use of the plurality of anchor reference images, the position determination is enabled even when the user moves or the direction of the camera is changed. In addition, when a plurality of anchors is detected in the camera-shot video, the positioning accuracy can be increased. Further, by combining motion sensors in the terminal, it is possible to estimate the position and direction of the camera even when no anchor is detected in the shot video.
(Step S611)
Next, at step S611, the information processing apparatus detects the amount of change from the three-dimensional position and posture of the camera determined in the previous frame to the three-dimensional position and posture calculated in the current frame is detected. The detection is performed by the use of compensation for motion blur in the frame video resulting from the movement of the camera detected by the motion sensor. By passing the camera posture information and the information on correction of blur in the frame video to the event processing function, it is possible to correct display blur in the case of superimposition on the camera-shot video under control in accordance with JavaScript (registered trademark).
(Step S612)
Next, at step S612, the information processing apparatus determines whether the amount of change detected at step S611 is equal to or more than a predetermined threshold.

The threshold is a value preset from the JavaScript (registered trademark) program in the display control data and saved in the recording unit at step S407 described in FIG. 12.

When it is determined that the position of the image displayed on the display unit has changed by the predetermined threshold or more, the process moves to step S613.
(Step S613)
When it is determined that the three-dimensional position and posture of the camera has changed by the predetermined threshold or more, the information processing apparatus sets the position, direction, and area (dimensions) of the display unit, and the position, direction, and angle information of the camera as a result of the three dimensional positioning posture, and starts a process for event processing function at step S613.

Incidentally, to start the process for displaying and updating the virtual objects, the data processing unit of the information processing apparatus executes the process in accordance with the process flow described above with reference to FIG. 13 and then executes the process for displaying or updating the virtual objects.

[5. About Events as Triggers for Starting Display of Virtual Objects or Updating Display]

In the foregoing example, the change of the position and posture of the user terminal (camera) in excess of the predetermined threshold or the like is explained above as an example of an event as a trigger for the process for displaying the registration information setting point (POI) position identifiers and the registration information corresponding to the registration information setting points (POI) as virtual objects to be displayed on the display unit or the process for updating the display.

However, it is possible to not only superimpose and display the POIs on the real objects seen in the camera-shot video in accordance with the change in the position and posture of the user terminal (camera) as a trigger for the process for displaying virtual objects or the process for updating the display but also implement various display processes and display triggers according to the JavaScript (registered trademark) program by the JavaScript (registered trademark). In addition, the information provider can not only display the POIs in text by the use of the display control functions of HTML and CSS but also provide various display methods.

The data processing unit of the information processing apparatus (user terminal) 10 executes the process for displaying the registration information on the registration information setting points near the information processing apparatus or the process for updating the display with the detection of events according to changes in various predetermined contexts (situations) as triggers.

Specifically, for example, the data processing unit may perform the process for starting or updating display of virtual objects with the detection of events based on the following information as triggers:

(1) Position of the information processing apparatus (user terminal)
(2) Time (3) Action history of the user having the information processing apparatus (user terminal)

(4) User schedule information registered in the information processing apparatus or the server (5) User physical information (heartbeat, pulse, and the like)

(6) Sale information at stores and others (7) Setting information on the information processing apparatus (user terminal)

(8) Attribute (age, gender, interest, and the like) of the user of the information processing apparatus (user terminal)

(9) Line of sight of the user of the information processing apparatus (user terminal).

(1) Specific example of the process for starting or updating display of virtual objects with detection of an event based on the position of the information processing apparatus (user terminal) as a trigger. One specific example of the process is as follows, for example:

When the user moves with the information processing apparatus (user terminal), the process for starting or updating display of virtual objects is executed with detection of an event that the distance from the information processing apparatus (user terminal) to the registration information setting point (POI) falls within a predetermined distance (3 m). In this case, in the state in which the position and direction of the information terminal in the real world can be tracked by the three-dimensional position determination process from the reference real object information (anchor information), the positions of the information processing apparatus (user terminal) and the registration information setting point (POI) are measured by the three-dimensional position determination process, and the registration information setting point (POI) may not be necessarily included in the shot video.

Besides, to perform the process, the display control program such as JavaScript (registered trademark) defines a program executing a series of the following operations:

(a) Measuring the distance from the information processing apparatus (user terminal) to the registration information setting point (POI)

(b) Comparing the measured distance with a predetermined threshold (c) Determining the occurrence of an event when the measured distance becomes equal to or smaller than the predetermined threshold.

(2) Specific example of the process for starting or updating display of virtual objects with the detection of an event based on time as a trigger will be explained. One specific example of the process is as follows, for example:

For instance, when the user of the information processing apparatus (user terminal) is in the neighborhood of a restaurant at 11:00 am at which the restaurant is opened, the position of the restaurant, the menu of the restaurant and others are displayed as virtual objects.

Besides, to perform the process, the display control program such as JavaScript (registered trademark) defines a program executing a series of the following operations:

(a) Measuring the distance from the information processing apparatus (user terminal) to the registration information setting point (POI)

(b) Comparing the measured distance with a predetermined threshold (c) Acquiring the current time (d) Determining the occurrence of an event when the measured distance becomes equal to or smaller than the predetermined threshold and at the time for opening the registration information setting point (POI) (for example, the restaurant).

In addition, the information provision server provides the information processing apparatus with the registration information setting point correspondence registration information including the menu of the restaurant and others as virtual objects.

(3) Specific example of the process for starting or updating display of virtual objects with detection of an event based on the action history of the user of the information processing apparatus (user terminal) will be explained. One specific example of the process is as follows, for example:

The movement state of the user of the information processing apparatus (user terminal) (walking, running, or high-speed movement by car, train, or the like) is analyzed and optimum information according to the analysis information is displayed as virtual objects.

When the user is walking, for example, route information, seeing spot guide information, rest room location information, and the like according to the movement position and speed are displayed as virtual objects.

Besides, to perform the process, the display control program such as JavaScript (registered trademark) defines a program executing a series of the following operations:

(a) Measuring the distance from the information processing apparatus (user terminal) to the registration information setting point (POI)

(b) Comparing the measured distance with a predetermined threshold (c) Determining the occurrence of an event when the measured distance becomes equal to or smaller than the predetermined threshold.

In addition, the information provision server provides the information processing apparatus with the route information, seeing spot guide information, rest room location information, and the like as virtual objects.

(4) Specific example of the process for starting or updating virtual objects with detection of an event based on user schedule information registered in the information processing apparatus or the server as a trigger will be explained. One specific example of the process is as described below, for example.

To perform the process, it is necessary to register the user schedule information in advance in the memory of the information processing apparatus or the information provision server.

At the time for starting a registered schedule plan or a specific time before the starting time, the information processing apparatus (user terminal) displays the designated place for the scheduled plan, the schedule information, and the like as virtual objects.

Besides, to perform the process, the display control program such as JavaScript (registered trademark) defines a program executing a series of the following operations:

(a) Acquiring the registered schedule information (b) Acquiring the current time (c) Determining the occurrence of an event at the set time in the registered schedule information or a specific time before the set time.

In addition, the information provision server provides the information processing apparatus with the designated place for the scheduled plan, the schedule information, and the like as virtual objects.

(5) Specific example of the process for starting or updating virtual objects with detection of an event based on the user physical information (heartbeat, pulse, and the like) as a trigger will be explained. One specific example of the process is as follows, for example:

To perform the process, it is necessary to set a configuration for inputting detection information from a sensor measuring the user physical information into the information processing apparatus.

The sensor measures the user's heartbeat, pulse, and the like, and outputs the measurement information to the information processing apparatus.

Specifically, when the user is running a marathon, for example, the data processing unit of the user's information processing apparatus displays information on the user's heartbeat and pulse states, for example, information for encouraging the user to breathe deeply or get rest, or the guide information on neighboring rest spots as virtual objects.

Besides, to perform the process, the display control program such as JavaScript (registered trademark) defines a program executing a series of the following operations:

(a) Acquiring the user physical information from the sensor (b) Detecting an event according to the input physical information.

In addition, the information provision server provides the information processing apparatus with the information according to the user's heartbeat and pulse states, for example, information for encouraging the user to breathe deeply or get rest, or the guide information on neighboring rest spots as virtual objects.

(6) Specific example of the process for starting or updating display of virtual objects with detection of an event based on sale information at stores and others as a trigger will be explained. One specific example of the process is as follows, for example:

For instance, when the user of the information processing apparatus (user terminal) is in the neighborhood of a store at 10:00 am at which sale is started at the store, the information processing apparatus displays the position of the store, the description of the sale at the store, and others as virtual objects.

Besides, to perform the process, the display control program such as JavaScript (registered trademark) defines a program executing a series of the following operations:

(a) Measuring the distance from the information processing apparatus (user terminal) to the registration information setting point (POI)

(b) Comparing the measured distance with a predetermined threshold (c) Acquiring the current time (d) Determining the occurrence of an event when the measured distance becomes equal to or smaller than the predetermined threshold and at the time for opening the registration information setting point (POI) (for example, the store).

In addition, the information provision server provides the information processing apparatus with the registration information setting point correspondence registration information including the description on the sale at the store as virtual objects.

(7) Specific example of the process for starting or updating display of virtual objects with detection of an event based on setting information on the information processing apparatus (user terminal) will be explained. One specific example of the process is as described below, for example.

The setting information on the information processing apparatus (user terminal) is the setting on the language for display, the setting on the presence or absence of audio output, and the like, for example.

For instance, when the language for display is set to Japanese, Japanese registration information is provided as virtual objects. When the language for display is set to English, English registration information is provided as virtual objects. In addition, when the setting on audio output is ON, audio registration information may be output.

Besides, to perform the process, for example, the display control program such as JavaScript (registered trademark) defines a program executing the operation for detecting the registration information setting points (POI) in accordance with the foregoing example and the following operation:

(a) Acquiring the setting information on the information processing apparatus (user terminal).

In addition, the information provision server provides the information processing apparatus with the language, the display data, or the audio data according to the setting information on the information processing apparatus (user terminal).

(8) Specific example of the process for starting or updating display of virtual objects with detection of an event based on the attributes (age, gender, interest, and the like) of the user of the information processing apparatus (user terminal) will be explained. One specific example of the process is as described below, for example.

To perform the process, it is necessary to register the user attribute information on the user's age, gender, interest, and the like in advance in the memory of the information processing apparatus or the information provision server.

The information processing apparatus displays virtual objects including the optimum provision information according to the registered user's attributes.

Besides, to perform the process, for example, the display control program such as JavaScript (registered trademark) defines a program executing the operation for detecting the registration information setting points (POI) in accordance with the foregoing example and the following operation:

(a) Acquiring the registered user's attribute information.

In addition, the information provision server provides the information processing apparatus with the virtual objects including the optimum provision information according to the setting information on the information processing apparatus (user terminal).

Specific display examples of virtual objects will be explained with reference to FIGS. 16 and 17.

Figure 16:
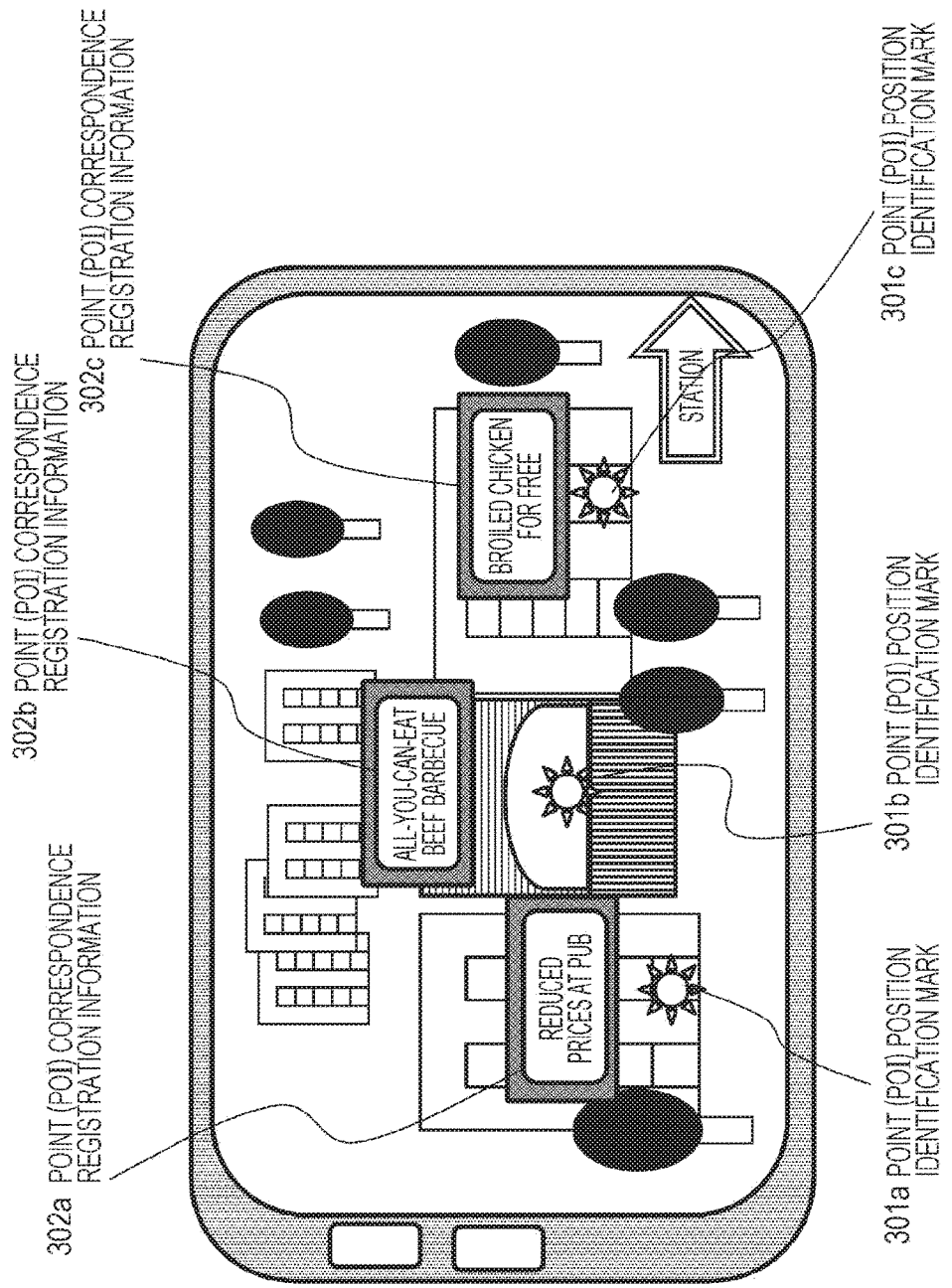
FIG. 16 is a diagram illustrating a specific display example of virtual objects.

FIG. 16 illustrates a display example of virtual objects with registration of the user attribute information indicating that the user is a middle-aged man in thirties to fifties and is fond of drinking.

For example, it is assumed that a plurality of users with the same attributes (middle-aged men in thirties to fifties and fond of drinking) is walking in company while carrying their individual information processing apparatuses.

In this case, the virtual objects as illustrated in FIG. 16 are displayed on their respective information processing apparatuses.

Specifically, point (POI) position identification marks 301 indicating the locations of restaurants serving liquor and pubs and point (POI) correspondence registration information 302 are displayed in sequence.

Figure 17:
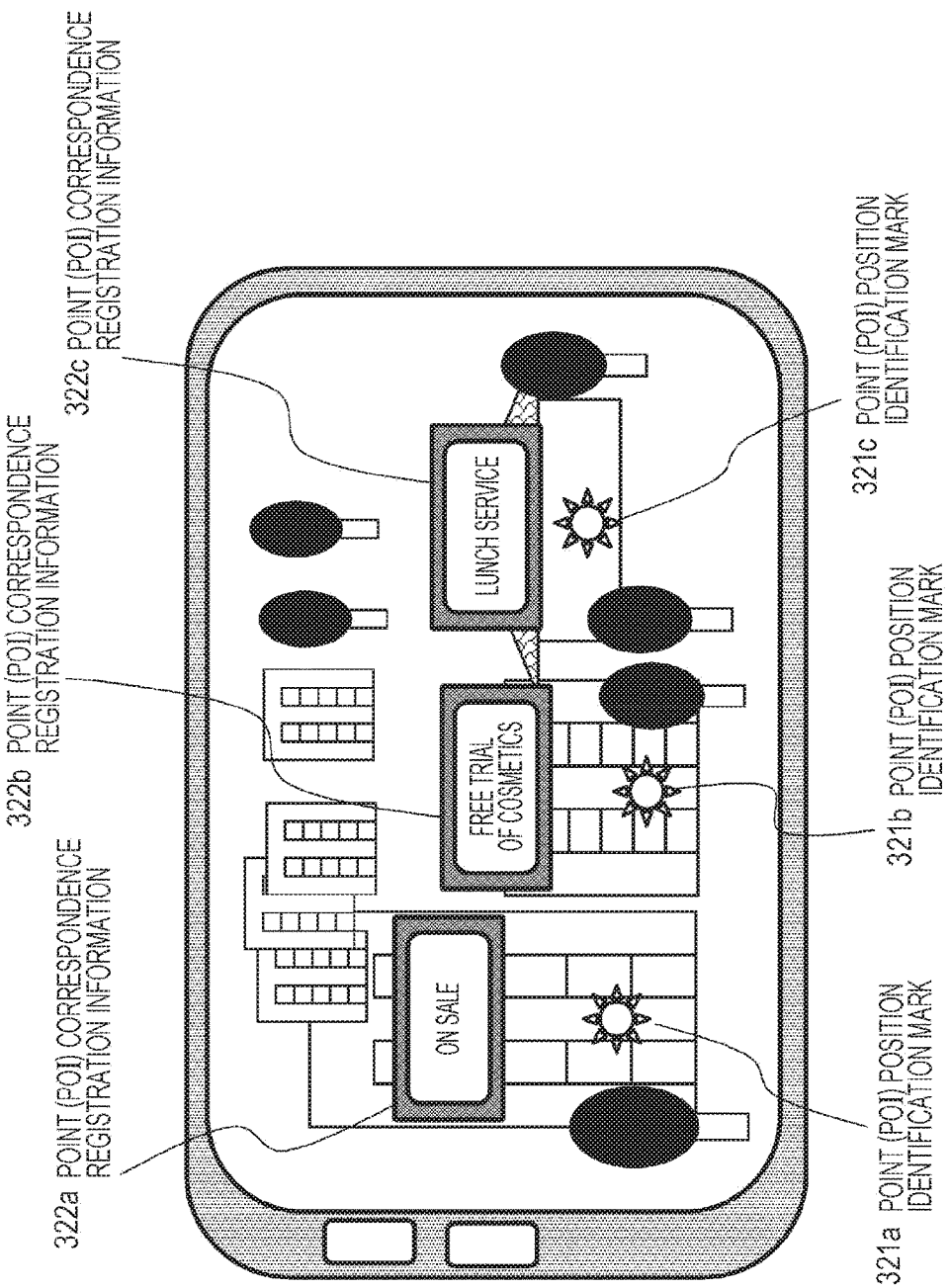
FIG. 17 is a diagram illustrating a specific display example of virtual objects.

FIG. 17 illustrates a display example of virtual objects with registration of the user attribute information indicating that the user is a woman in twenties to thirties and fond of shopping.

In this case, virtual objects as illustrated in FIG. 17 are displayed on the information processing apparatus.

Specifically, point (POI) position identification marks 321 indicating the positions of stores selling items seemingly preferred by women in twenties to thirties and point (POI) correspondence registration information 322 are displayed in sequence.

(9) Specific example of the process for starting or updating display of virtual objects with detection of an event as a trigger based on the line of sight of the user of the information processing apparatus (user terminal) will be explained. One specific example of the process is as described below, for example.

To perform the process, it is necessary to set a configuration for inputting the detection information from the sensor measuring the user's line of sight into the information processing apparatus.

The sensor detects the direction of the user's line of sight and outputs the detection information to the information processing apparatus.

The data processing unit of the information processing apparatus executes the process for displaying the registration information on the registration information setting point (POI) existing in the direction of the user's line of sight on a priority basis.

Besides, to perform the process, for example, the display control program such as JavaScript (registered trademark) defines a program executing the operation for detecting the registration information setting point (POI) in accordance with the foregoing example and the following operation:

(a) Inputting the detection result of the direction of the user's line of sight and deciding display objects.

As described above, various events can be set as events constituting triggers for the process for displaying the virtual objects or the process for updating the display.

[6. About Configuration Examples of the Information Processing Apparatus and the Server]

Next, configuration examples of the information processing apparatus (user terminal), the information provision server, and the search server will be explained.

Figure 18:
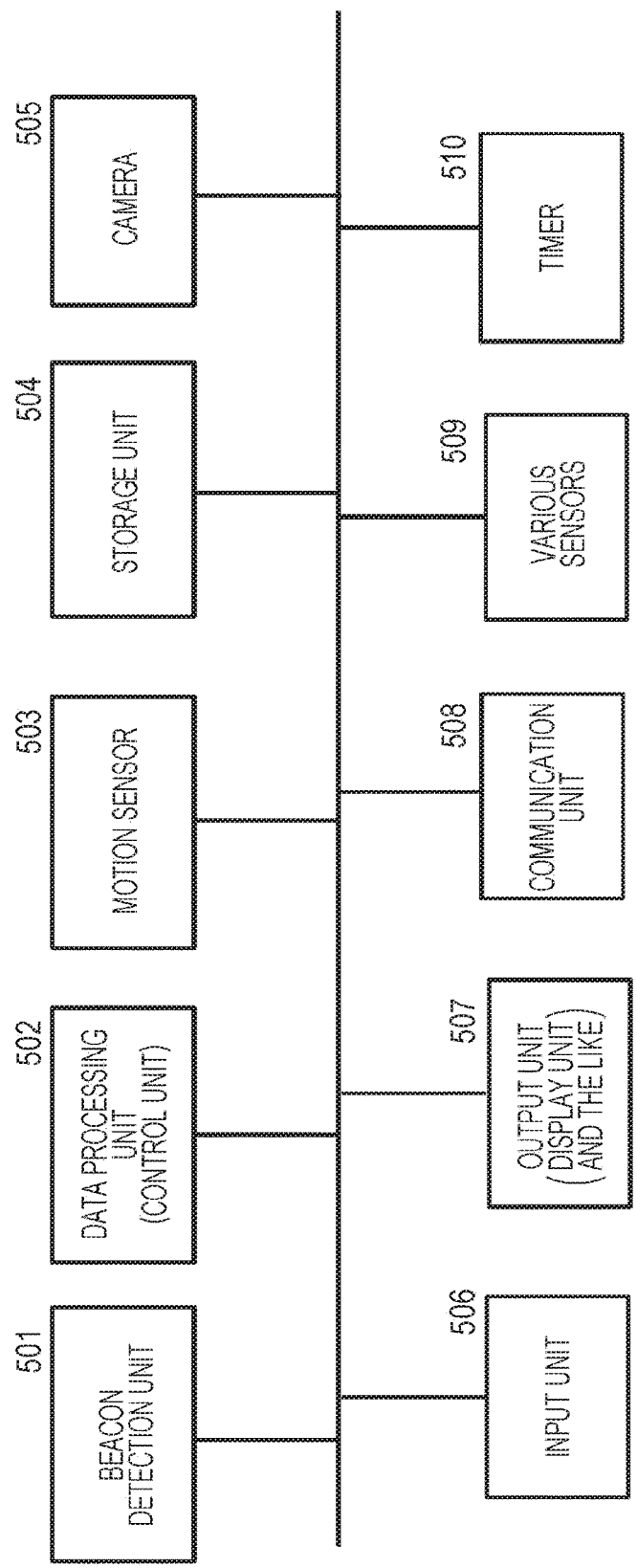
FIG. 18 is a diagram illustrating a configuration example of the information processing apparatus.

FIG. 18 is a block diagram illustrating a configuration example of the information processing apparatus (user terminal) 10.

The information processing apparatus 10 has a beacon detection unit 501, a data processing unit (control unit) 502, a motion sensor 503, a storage unit 504, a camera (imaging unit) 505, an input unit 506, an output unit (display unit) 507, a communication unit 508, various sensors 509, and a timer 510, as illustrated in FIG. 18.

The beacon detection unit 501 detects a beacon transmitted from the beacon transmitter 20.

The data processing unit (control unit) 502 performs various data processing operations in the information processing apparatus 10. Specifically, the data processing unit (control unit) 502 performs the processes in accordance with the flowcharts described above, for example. The data processing unit (control unit) 502 has a CPU having the function of program execution, and performs the processes in accordance with the programs stored in the storage unit 504, for example.

The motion sensor 503 is a sensor that detects the motion of the information processing apparatus. The motion sensor 503 is composed of various sensors that detect the direction of movement, inclination, acceleration, and the like.

The storage unit 504 is composed of a RAM, a ROM, a HDD, and other media, for example, to store programs executed by the data processing unit 5602, various parameters, and others. The storage unit 504 is further used as a work area for data processing executed by the data processing unit.

The camera (imaging unit) 505 executes image shooting. Incidentally, as described above, in the case of shooting a three-dimensional image, the camera (imaging unit) 505 has two imaging units in separated positions, and in the case of shooting a two-dimensional image, the camera (imaging unit) 505 has one imaging unit.

The input unit 506 is a user operation unit for the user to input various instructions. Incidentally, when the display unit is configured as a touch panel, the display unit also serves as an input unit.

The output unit 507 is composed of a display unit, an audio output unit, and others. The display unit displays a real object as a camera-shot image in accordance with the process described above, and superimposes and displays point (POI) position identification marks and point (POI) correspondence registration information as virtual objects acquired from the information provision server.

The communication unit 508 is a communication unit that communicates with the information provision server, the search server, and other external devices.

The various sensors 509 are sensors that measure various user conditions such as a line-of-sight sensor and a pulse sensor, for example.

The data processing unit 502 can update display of the virtual objects in accordance with the sensor detection information.

The timer 510 detects the current time, measures a time elapsed from a predetermined timing and the like.

Figure 19:
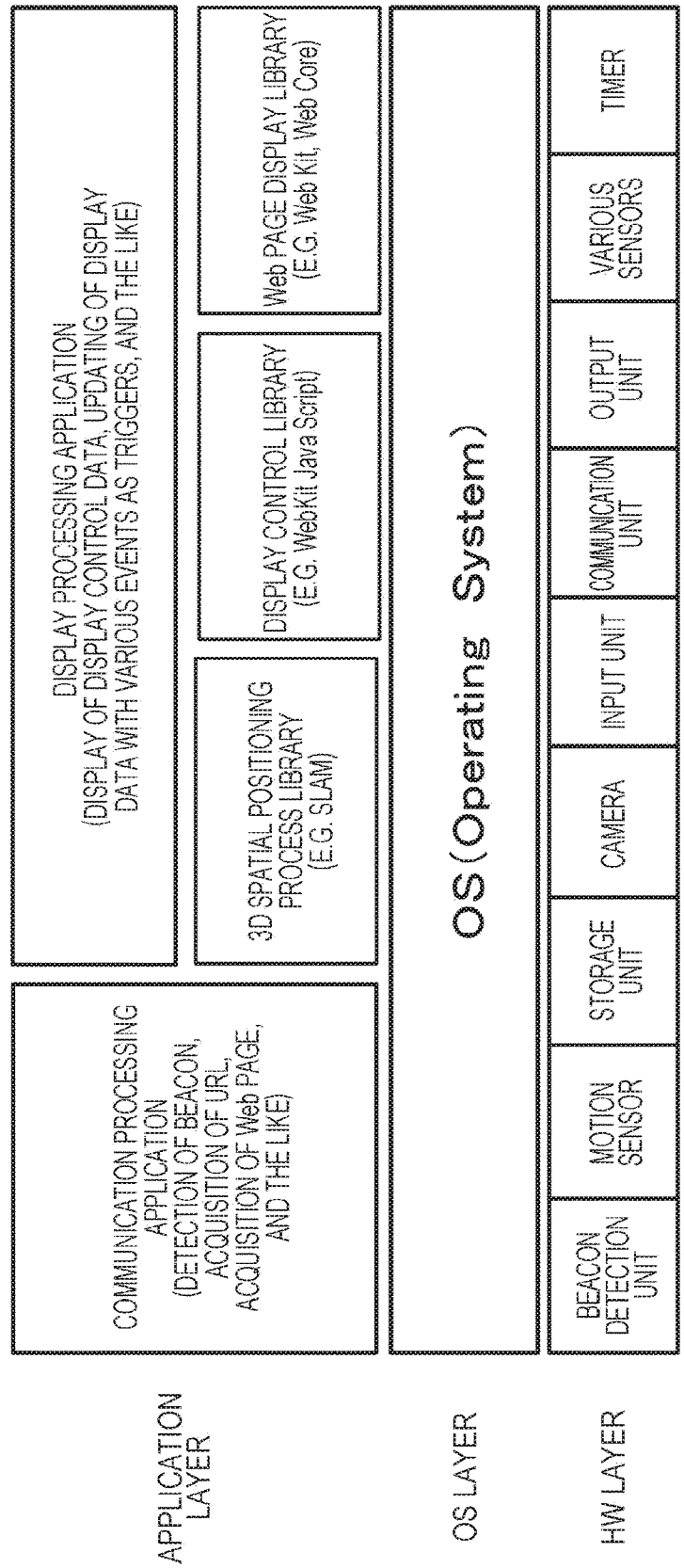
FIG. 19 is a diagram illustrating a configuration example of the information processing apparatus.

FIG. 19 is a hierarchy diagram describing a layer configuration of data processing programs executed by the data processing unit 502 executing various processes.

The data processing unit 502 executes various applications on an operating system (OS) layer.

A communication processing application illustrated in the diagram is an application for detecting a beacon, acquiring an URL, and instructing the display processing apparatus for displaying a web page on the basis of the URL. The communication processing application performs steps S301 to S306 described in FIG. 10.

A display processing application performs the process for displaying an image shot by the camera, the process for displaying virtual objects provided by the information provision server, and the like.

In addition, the display processing application performs the process for displaying display control data and the process for displaying virtual objects and updating the display at the time of occurrence of an event as a trigger.

Besides, the display processing application performs the process for outputting or updating the display information together with processes performed by a 3D spatial positioning library, a display control library, and a web page display library illustrated under the display processing application in FIG. 19.

The 3D spatial positioning library performs a three-dimensional positioning process for calculating the three-dimensional position, direction (inclination), and the like of the information processing apparatus on the basis of the objects shot by the camera and the reference images. Specifically, the 3D spatial positioning library performs the three-dimensional positioning process by the use of the SLAM technique and the like as described above.

The display control library is an execution unit of WebKit and JavaScript (registered trademark) that performs the process for displaying virtual objects on the display unit and the process for updating the display at the time of occurrence of an event such as the user's operation as a trigger.

The web page display application is composed of WebKit WebCore, and the like and performs the process for displaying web pages.

These applications and libraries are operable on the OS layer. The OS layer controls the overall processes performed by the applications, and controls input/output of commands, parameters, and others between various processing units set in the hardware (HW) layer and the application layer, and others.

FIG. 20 illustrates a hardware configuration example of a communication apparatus applicable as an information provision server or a search server.

A central processing unit (CPU) 701 serves as a data processing unit that performs various processes in accordance with the programs stored in a read only memory (ROM) 702 or a storage unit 708. For example, the CPU 701 performs the processes in accordance with the sequences explained above in relation to the foregoing example. A random access memory (RAM) 703 stores the programs executed by the CPU 701, data, and others. The CPU 701, the ROM 702, and the RAM 703 are connected together via a bus 704.

The CPU 701 is connected to an input/output interface 705 via the bus 704. The input/output interface 705 is connected to an input unit 706 composed of various switches, a keyboard, a mouse, a microphone, and the like, and an output unit 707 composed of a display, a speaker, and the like. The CPU 701 executes various processes in response to instructions input through the input unit 706, and outputs the processing results to the output unit 707, for example.

The storage unit 708 connected to the input/output interface 705 is composed of a hard disc and the like, for example, and stores the programs executed by the CPU 701 and various data. A communication unit 709 serves as a transmitter/receiver for data communications via networks such as the Internet and local area networks to communicate with external apparatuses.

The drive 710 connected to the input/output interface 705 drives a removable medium 711 such as a magnetic disc, an optical disc, a magneto-optical disc, or a semiconductor memory such as a memory card to record data or read data.

[7. Summary of a Configuration of the Present Disclosure]

The example of the present disclosure has been described in detail so far with reference to the specific example. However, it is obvious that those skilled in the art can modify the example or replace the same with another one without deviating from the gist of the present disclosure. That is, the present invention has been disclosed in the form of exemplification and should not be interpreted in a limited way. To determine the gist of the present disclosure, the claims should be referred to.

Incidentally, the technology disclosed herein can take the following configurations:

(1) An information processing apparatus including:
an imaging unit;
a display unit that displays an image shot by the imaging unit; and
a data processing unit that displays on the display unit a virtual object including registration information on a real-world registration information setting point included in the shot image, wherein
the data processing unit inputs virtual object display control data that records an anchor as a reference image of a real object shot in a real world, and positional information on the anchor and positional information on the registration information setting point in a virtual three-dimensional spatial coordinate system, and performs a process for displaying the registration information described in the display control data or a process for updating the display with detection of an event in accordance with a change in predefined context as a trigger, and
the data processing unit displays the virtual object indicative of the registration information setting point in conjunction with the display of the registration information.

(2) The information processing apparatus according to (1), wherein
the virtual object display control data includes hyper text markup language (HTML) data that records positional information on the anchor as the reference image obtained by shooting the real object and the registration information setting point in a three-dimensional space, and a display control program, and
the data processing unit detects the anchor from the image shot by the imaging unit, determines the position of the imaging unit in a virtual three-dimensional space from the position and direction of the detected anchor in virtual three-dimensional spatial coordinates, calculates the position of the registration information setting point in a display unit coordinate system as a coordinate system of the display unit, and displays the virtual object indicative of the registration information setting point in the calculated position.

(3) The information processing apparatus according to (1) or (2), wherein the data processing unit performs a process for updating the display of the virtual object on the display unit on condition that the position of the registration information setting point has moved by a predetermined threshold or more.

(4) The information processing apparatus according to any one of (1) to (3), wherein the data processing unit performs a process for displaying the virtual object on the display unit or a process for updating the display on condition that the user has input an instruction.

(5) The information processing apparatus according to any one of (1) to (4), wherein the data processing unit displays the registration information on the registration information setting point on the display unit on condition that the distance between the information processing apparatus and the registration information setting point becomes equal to or less than a predetermined threshold.

(6) The information processing apparatus according to any one of (1) to (5), wherein the data processing unit displays the registration information on the registration information setting point on the display unit on condition that a time predefined in association with the registration information setting point has come.

(7) The information processing apparatus according to any one of (1) to (6), wherein the data processing unit displays the registration information on the registration information setting point on the display unit on condition that it is determined that an action history of the user of the information processing apparatus and a predefined action history coincide with each other.

(8) The information processing apparatus according to any one of (1) to (8), wherein the data processing unit displays the registration information on the registration information setting point on the display unit in accordance with pre-registered schedule information on the user of the information processing apparatus.

(9) The information processing apparatus according to any one of (1) to (8), further including a sensor that detects physical information on the user of the information processing apparatus, wherein the data processing unit displays the registration information on the registration information setting point on the display unit on condition that there is a match between input from the sensor and a predefined condition.

(10) The information processing apparatus according to any one of (1) to (9), wherein the data processing unit changes the output mode of the registration information in accordance with setting information on the information processing apparatus.

(11) The information processing apparatus according to any one of (1) to (10), wherein the data processing unit selects the registration information to be output in accordance with user attribute information recorded in the information processing apparatus.

(12) The information processing apparatus according to any one of (1) to (11), further including a sensor that detects the direction of line of sight of the user of the information processing apparatus, wherein the data processing unit displays on the display unit the registration information on the registration information setting point in the direction of the user's line of sight detected by the sensor.

(13) An information processing method executed by an information processing apparatus, wherein the information processing apparatus includes an imaging unit, a display unit that displays an image shot by the imaging unit, and a data processing unit that displays on the display unit a virtual object including registration information on a real-world registration information setting point included in the shot image, the data processing unit inputs virtual object display control data that records an anchor as a reference image of a real object shot in a real world, and positional information on the anchor and positional information on the registration information setting point in a virtual three-dimensional spatial coordinate system, and performs a process for displaying the registration information described in the display control data or a process for updating the display with detection of an event in accordance with a change in predefined context as a trigger, and the data processing unit displays the virtual object indicative of the registration information setting point in conjunction with the display of the registration information.

(14) A program for causing an information processing apparatus to execute information processing, wherein the information processing apparatus includes an imaging unit, a display unit that displays an image shot by the imaging unit, and a data processing unit that displays on the display unit a virtual object including registration information on a real-world registration information setting point included in the shot image, and the program causes the data processing unit to:

input virtual object display control data that records an anchor as a reference image of a real object shot in a real world, and positional information on the anchor and positional information on the registration information setting point in a virtual three-dimensional spatial coordinate system;

perform a process for displaying the registration information described in the display control data or a process for updating the display with detection of an event in accordance with a change in predefined context as a trigger; and display the virtual object indicative of the registration information setting point in conjunction with the display of the registration information.

In addition, the series of processes explained herein can be performed by hardware, software, or a combination of the two. In the case of performing the processes by software, a program recording the process sequences can be installed in a memory of a computer incorporated in dedicated hardware for execution or can be installed in a general-purpose computer capable of executing the various processes for execution. For example, the program can be recorded in advance in a recording medium. The program can be installed from the recording media into a computer or the program can be received via a network such as a local area network (LAN) and the Internet and installed in a recording medium such as an internal hard disc or the like.

Incidentally, the various processes described herein may be executed on a time-series basis in accordance with the description or may be executed in parallel or individually in accordance with the performance of the apparatus executing the processes or as necessary. In addition, the system described herein is a logical assembly of a plurality of apparatuses but the apparatuses as constituent elements may not be contained in the same housing.

INDUSTRIAL APPLICABILITY

As explained above, according to a configuration of an example of the present disclosure, it is possible to achieve an apparatus and a method by which to perform a process for displaying registration information on a real-world registration information setting point and a process for updating the display with detection of an event in accordance with a change in the context as a trigger.

Specifically, a control for displaying a virtual object including registration information on a real-world registration information setting point is performed. The data processing unit performs a process for displaying registration information described in control data and a process for updating the display in accordance with a change in predefined context. Further, the data processing unit displays the virtual object indicative of the registration information setting point in conjunction with the display of the registration information. The data processing unit calculates the positional relationship between the information processing apparatus and the registration information setting point on the basis of the position, direction, and the like of a reference image (anchor) detected from the shot image in a virtual three-dimensional space, and displays the virtual object indicative of the registration information setting point on the basis of the calculated positional relationship and a change in the context.

According to this configuration, it is possible to achieve an apparatus and a method by which to perform a process for displaying registration information on a real-world registration information setting point and a process for updating the display with detection of an event in accordance with a change in the context as a trigger.

REFERENCE SIGNS LIST

10 Information processing apparatus (user terminal)
20 Beacon transmitter
30 Network
40 Search server
50 Information provision server
101 and 102 Registration information setting point (POI)

111 and 121 Point (POI) position identification mark
121 and 122 Point (POI) correspondence registration information
201 and 202 Reference real object
211 and 212 Registration information setting point (POI)
301 Point (POI) position identification mark
302 Point (POI) correspondence registration information
321 Point (POI) position identification mark
322 Point (POI) correspondence registration information
501 Beacon detection unit
502 Data processing unit (control unit)
503 Motion sensor
504 Storage unit
505 Camera
506 Input unit
507 Output unit (display unit and the like)
508 Communication unit
509 Various sensors
510 Timer
701 CPU
702 ROM
703 RAM
704 Bus
705 Input/output interface
706 Input unit
707 Output unit
708 Storage unit
709 Communication unit
710 Drive
711 Removable medium

The invention claimed is:

1. An information processing apparatus, comprising:
circuitry configured to:
  shoot an image of a real space;
  control a display device to display the image;
  control the display device to display a virtual object that includes registration information, wherein the registration information is associated with a registration information setting point included in the image;
  input virtual object display control data, in a virtual three-dimensional spatial coordinate system, wherein the virtual object display control data indicates:
    an anchor as a reference image of a real object,
    first positional information associated with the anchor, and
    second positional information associated with the registration information setting point;
  detect the anchor, from the image, based on the virtual object display control data;
  determine a position of the information processing apparatus, in a virtual three-dimensional space, based on a position of the detected anchor and an orientation of the detected anchor; and
  control the display device to display the registration information such that the virtual object is displayed in conjunction with the registration information.

2. The information processing apparatus according to claim 1, wherein
the virtual object display control data includes hyper text markup language (HTML) data and a display control program, and
the circuitry is further configured to:
  calculate a position of the registration information setting point in a coordinate system of the display device, and
  display the virtual object indicative of the registration information setting point in the calculated position.

3. The information processing apparatus according to claim 1, wherein the circuitry is further configured to update the display of the virtual object on the display device based on a position of the registration information setting point that has moved by a distance, wherein the distance is greater than or equal to a determined threshold.

4. The information processing apparatus according to claim 1, wherein the circuitry is further configured to:
  control the display device to display the virtual object; or
  control the display device to update the display on the display device, based on a user input.

5. The information processing apparatus according to claim 1, wherein the circuitry is further configured to control the display device to display the registration information on the registration information setting point based on a distance between the information processing apparatus and the registration information setting point that is equal to or less than a threshold distance.

6. The information processing apparatus according to claim 1, wherein the circuitry is further configured to control the display device to display the registration information on the registration information setting point based on a defined time corresponding to the registration information setting point.

7. The information processing apparatus according to claim 1, wherein the circuitry is further configured to control the display device to display the registration information on the registration information setting point based on a determination that an action history of a user of the information processing apparatus and a defined action history coincide with each other.

8. The information processing apparatus according to claim 1, wherein the circuitry is further configured to control the display device to display the registration information on the registration information setting point based on registered schedule information associated with a user of the information processing apparatus.

9. The information processing apparatus according to claim 1, further including:
a sensor configured to detect physical information associated with a user of the information processing apparatus,
wherein the circuitry is further configured to control the display device to display the registration information on the registration information setting point based on a match between an input from the sensor and a defined condition.

10. The information processing apparatus according to claim 1, wherein the circuitry is further configured to change an output mode of the registration information based on setting information, wherein the setting information is associated with the information processing apparatus.

11. The information processing apparatus according to claim 1, wherein the circuitry is further configured to:
  acquire user attribute information; and
  select the registration information based on the user attribute information.

12. The information processing apparatus according to claim 1, further including:
a sensor configured to detect a direction of a line of sight of a user of the information processing apparatus,
wherein the circuitry is further configured to control the display device to display the registration information on the registration information setting point in the direction of the line of sight.

13. An information processing method executed by an information processing apparatus, the information processing method comprising:
  shooting an image of a real space;
  controlling, a display device, to display the image;
  controlling, the display device, to display a virtual object that includes registration information, wherein the registration information is associated with a registration information setting point included in the shot image;
  inputting virtual object display control data, in a virtual three-dimensional spatial coordinate system, wherein the virtual object display control data indicates:
    an anchor as a reference image of a real object,
    first positional information associated with the anchor, and
    second positional information associated with the registration information setting point;
  detecting the anchor, from the image, based on the virtual object display control data;
  determining a position of the information processing apparatus, in a virtual three-dimensional space, based on a position of the detected anchor and an orientation of the detected anchor; and
  controlling the display device to display the registration information such that the virtual object is displayed in conjunction with the registration information.

14. A non-transitory, computer-readable medium having stored thereon, computer-executable instructions which when executed by an information processing apparatus cause the information processing apparatus to execute operations, the operations comprising:
  shooting an image of a real space;
  controlling display of the image;
  controlling display of a virtual object that includes registration information, wherein the registration information is associated with a registration information setting point included in the image;
  inputting virtual object display control data, in a virtual three-dimensional spatial coordinate system, wherein the virtual object display control data indicates:
    an anchor as a reference image of a real object,
    first positional information associated with the anchor, and
    second positional information associated with the registration information setting point;
  detecting the anchor, from the image, based on the virtual object display control data;
  determining a position of the information processing apparatus, in a virtual three-dimensional space, based on a position of the detected anchor and an orientation of the detected anchor; and
  controlling the display of the registration information such that the virtual object is displayed in conjunction with the registration information.

* * * * *